US012621140B2

(12) United States Patent
Cárdenes Cabré et al.

(10) Patent No.:   US 12,621,140 B2
(45) Date of Patent:   *May 5, 2026

(54) ACCESS GATEWAY SYSTEM FOR ACCESSING A RESOURCE

(71) Applicant: Via Science, Inc., Somerville, MA (US)

(72) Inventors: Jesús Alejandro Cárdenes Cabré, Montreal (CA); Jeremy Taylor, Montreal (CA); Madjid Aoudia, Montreal (CA); John Christopher Muddle, Barcelona (ES); Colin Gounden, Cambridge, MA (US)

(73) Assignee: Via Science, Inc., Somerville, MA (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/774,171

(22) Filed: Jul. 16, 2024

(65) Prior Publication Data

US 2024/0372719 A1     Nov. 7, 2024

Related U.S. Application Data

(63) Continuation-in-part of application No. 18/603,590, filed on Mar. 13, 2024, now Pat. No. 12,177,220.
(Continued)

(51) Int. Cl.
| | |
|---|---|
| *H04L 9/40* | (2022.01) |
| *H04L 9/08* | (2006.01) |
| *H04L 9/32* | (2006.01) |

(52) U.S. Cl.
CPC .................................... *H04L 9/088* (2013.01)

(58) Field of Classification Search
CPC ....... H04L 63/10; H04L 9/3218; H04L 63/20; G06F 21/64; H04W 12/08; H04W 12/108
See application file for complete search history.

(56) References Cited

U.S. PATENT DOCUMENTS

| | | | | |
|---|---|---|---|---|
| 7,305,705 B2 * | 12/2007 | Shelest | ................... | H04L 63/08 726/11 |
| 2018/0067848 A1 * | 3/2018 | Baldwin | ............. | G06F 12/1458 |

(Continued)

OTHER PUBLICATIONS

Zhang et al., "Integrating Blockchain and Deep Learning Into Extremely Resource-Constrained IoT: An Energy-Saving Zero-Knowledge PoL Approach," IEEE Internet of Things Journal Year: 2024 | vol. 11, Issue: 3 | Journal Article | Publisher: IEEE.*

(Continued)

*Primary Examiner* — Roderick Tolentino
(74) *Attorney, Agent, or Firm* — Pierce Atwood LLP

(57) ABSTRACT

An access gateway may grant a requestor access to a computer resource. The requestor may receive a credential from an identity provider and calculate a zero-knowledge proof of possession of the credential. The requestor may use the proof to request access to the computer resource. The identity provider may record a policy corresponding to the credential in a distributed ledger. The access gateway may, subject to verifying the proof, retrieve the policy from the distributed ledger. The access gateway may grant the requestor access to the computer resource as indicated by the policy. For example, the access gateway may allow the requestor to transfer data from a classified data storage component to a declassified data storage component. In some cases, the classified data storage component may encrypt data (e.g., using an encryption key provided by the requestor and/or the declassified data storage component) prior to transfer.

20 Claims, 11 Drawing Sheets

Related U.S. Application Data

(60) Provisional application No. 63/490,038, filed on Mar. 14, 2023.

(56) References Cited

U.S. PATENT DOCUMENTS

| | | | | |
|---|---|---|---|---|
| 2018/0096551 | A1* | 4/2018 | Kraemer | H04L 9/3263 |
| 2019/0386969 | A1* | 12/2019 | Verzun | G06F 21/606 |
| 2020/0099530 | A1* | 3/2020 | Khatib | G06N 20/00 |
| 2020/0162431 | A1* | 5/2020 | Goldschlag | H04L 9/3218 |
| 2021/0334769 | A1* | 10/2021 | Kress | H04L 9/3247 |
| 2022/0345312 | A1* | 10/2022 | Larmuseau | G06Q 20/3829 |
| 2023/0412379 | A1* | 12/2023 | Yanai | H04L 9/3213 |
| 2024/0070315 | A1* | 2/2024 | Parla | G06F 21/6245 |
| 2024/0114012 | A1 | 4/2024 | Venkatesan et al. | |

OTHER PUBLICATIONS

Chang et al., "Verifying the Computational Integrity of Power Grid Controls with Zero-Knowledge Proof," 2023 IEEE Power & Energy Society General Meeting (PESGM) Year: 2023 | Conference Paper | Publisher: IEEE.*

International Search Report and Written Opinion mailed on Jul. 3, 2024 for International Application No. PCT/US2024/019671, filed Mar. 13, 2024, 14 pages.

Belchior, Rafael, et al. "SSIBAC: Self-Sovereign Identity Based Access Control." 2020 IEEE 19th International Conference on Trust, Security and Privacy in Computing and Communications (Trustcom), IEEE, Dec. 29, 2020, pp. 1935-1943.

Naghmouchi, Montassar, et al. "An Automatized Identity and Access Management System for IoT Combining Self-Sovereign Identity and Smart Contracts," Jun. 15, 2022, pp. 208-217.

Hu, Vincent C. "Blockchain for Access Control Systems," National Institute of Standards and Technology, May 1, 2022. URL: https://nvlpubs.nist.gov/nistpubs/ir/2022/NIST.IR.8403.pdf, p. 7.

Anonymous author. "Autorisations IAM pour Cloud Storage," Retrieved from the internet on Jun. 23, 2024: URL: https://web.archive.org/web/20220819031746/https://cloud.google.com/storage/docs /access-control/iam-permissions?hl=fr, 5 pages.

Nicomette, Vincent, et al. "An authorization scheme for distributed object systems." Proceedings of the 1997 IEEE Symposium on Security and Privacy, May 1997, pp. 21-30. URL: https://ieeexplore.ieee.org/document/601310.

International Preliminary Report on Patentability mailed on Sep. 25, 2025 for International Application No. PCT/US2024/019671, filed Mar. 13, 2024, 8 pages.

International Search Report and Written Opinion mailed Oct. 22, 2025 for International Patent Application No. PCT/US2025/037063, filed Jul. 10, 2025.

* cited by examiner

FIG. 7

ACCESS GATEWAY SYSTEM FOR ACCESSING A RESOURCE

CROSS-REFERENCE TO RELATED APPLICATION

This application is a continuation-in-part of U.S. patent application Ser. No. 18/603,590, Filed Mar. 13, 2024, and entitled "ACCESS GATEWAY SYSTEM FOR ACCESS-ING A RESOURCE," which claims the benefit of priority of U.S. Provisional Patent Application No. 63/490,038, filed Mar. 14, 2023, and entitled "CRYPTOGRAPHICALLY SECURE GLOBAL ADDRESSING LIST FOR DATA VERIFICATION AND DECLASSIFICATION," the contents of both of which are incorporated herein by reference in their entirety.

BRIEF DESCRIPTION OF DRAWINGS

For a more complete understanding of the present disclosure, reference is now made to the following description taken in conjunction with the accompanying drawings.

FIG. 7 is a block diagram illustrating an example client device and system component communicating over a computer network, according to embodiments of the present disclosure.

DETAILED DESCRIPTION

Figure 1:
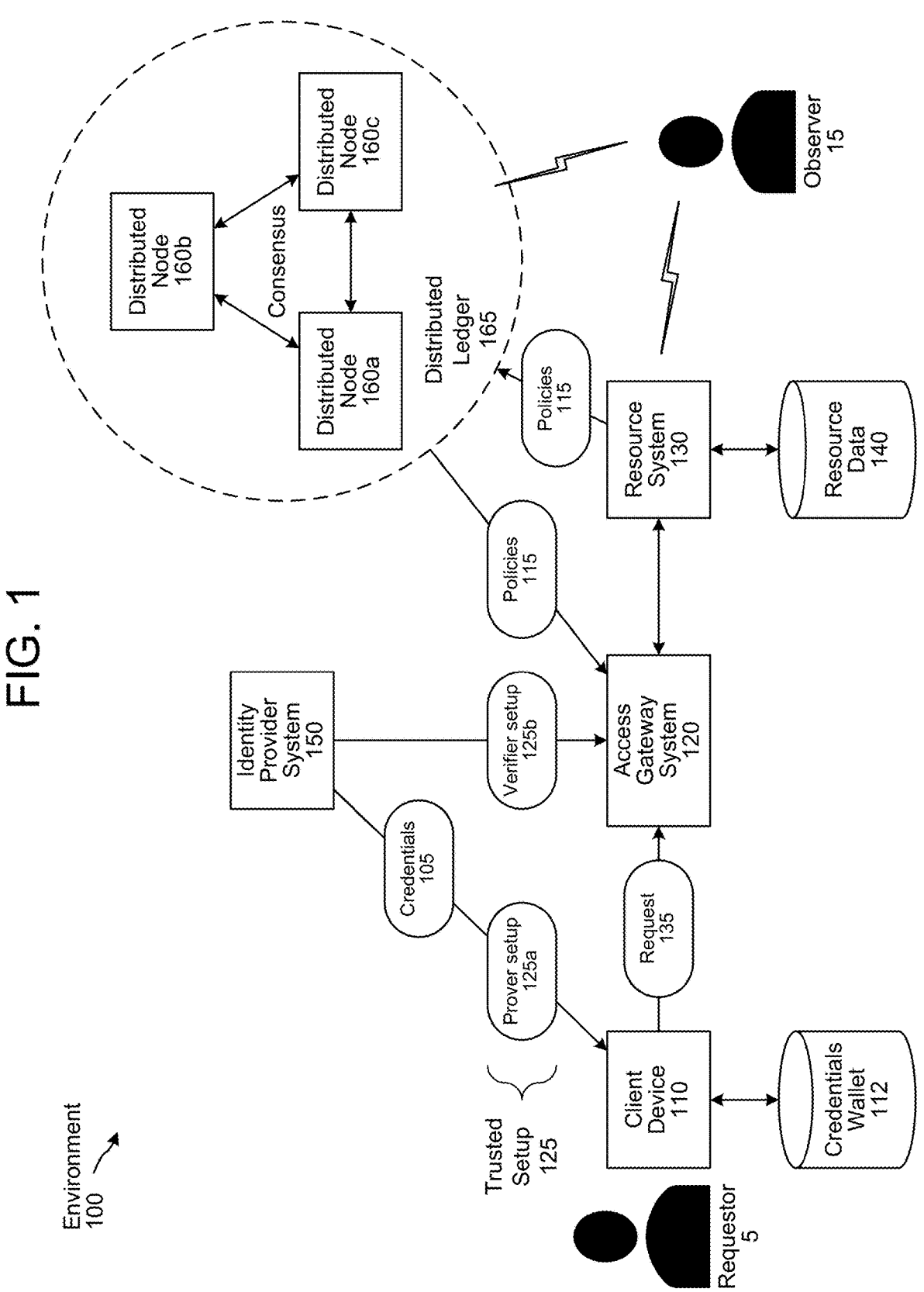
FIG. 1 is a conceptual diagram of an example environment in which an access gateway system may operate, according to embodiments of the present disclosure.

The systems and methods described herein relate to a cryptographically secure global addressing list for data verification and declassification. An access gateway system (AGS) may control access of a requestor to a computer resource. The computer resource may be, for example, a resource system and/or a data store. The requestor may be an individual such as a user, administrator, analyst, content creator, etc. requesting access to the computer resource. The requestor may seek access to the computer resources for various purposes, including, for example, declassifying data and relocate it to a declassified storage, executing a work-flow on a data owner system, and/or uploading digitally signed content to a content platform. The AGS may verify credentials of a requestor and retrieve policies corresponding to the credentials. The policies may pertain to permission to access the computer resource and may additionally specify granular permissions with regard to the resource system and/or data (e.g., read-only, write, delete, etc.).

In some implementations, the requestor may use a zero-knowledge proof to show possession of the relevant credential to the AGS. This may allow the AGS to determine that the requestor has a credential granting it access to the computer resource without knowing the exact identity of the requestor and/or without divulging the identity of the requestor to an observer. An identity provider system may provide the requestor with the credential and the AGS with data for verifying the proof.

The resource system may implement policies that govern, for example, which credentials correspond to which permissions. In some implementations, the resource system may record policies in a distributed ledger such as a blockchain. In some implementations, the resource system may record the policies along with credentials corresponding to request-ors to which the policies grants access. The tamper resistant nature of the distributed ledger may represent reliable evidence that the policies and/or corresponding credentials recorded therein accurately represent what the resource system originally intended/recorded. The distributed ledger may further provide a robust, reliable, and replicated record of the policies and/or credentials.

By combining zero-knowledge proof of credentials and distributed ledger recording of policies, the AGS may control access to a computer resource in a manner that may hide the exact identity of the requestor while showing that the access corresponded to a valid policy. Thus, while an observer may not be able to identify the requestor, the observer may see which requestors have been granted access based on the recorded policies. The observer may also see that, for a particular act, the AGS verified the requestor before permitting the act. The system may therefore balance the interests of trust (e.g., on the part of the observer) and privacy (e.g., of the requestor's identity). Such a balance may be useful in the several use cases described herein as well as others.

For example, a first use case (e.g., as described with reference to FIGS. 3A and 3B) may involve granting a requestor access to classified data. The AGS may control access to a classified data store including the ability to declassify data and/or relocate it to a declassified data store. The AGS may allow an observer to determine who has access to view/declassify data and/or verify that data was declassified properly while hiding the exact identity of the requestor.

A second use case (e.g., as described with reference to FIGS. 4A and 4B) may involve granting a requestor access to secured data for executing workflows on a data owner system.

A third use case (e.g., as described with reference to FIGS. 5A and 5B) may involve using the system as a gateway for managing the uploading of digitally signed content to a content platform. The requestor (e.g., a content creator) may maintain a private key and use it to add a digital signature to the content. The corresponding public key may be published to, for example, a distributed ledger. An observer may use the public key to authenticate the signed content.

A fourth use case (e.g., as described with reference to FIGS. 6A and 6B) may involve encrypting declassified data prior to transferring the data, via the AGS, to a declassified data storage. In some implementations, the fourth use case may represent a modification of, or an extension to, the first use case. For example, the recipient of the declassified data may provide an encryption key to classified data storage component for encrypting the classified data prior to declassification. The recipient may retain the decryption key for decrypting the declassified data.

Other uses cases of the described system are also possible. These features may be used alone or in combination with each other and/or other features described herein. Various operations of the systems and devices may be subject to user approval. The system may be implemented in a manner that ensures compliance with applicable laws, regulations, standards, etc. in which the systems and/or devices reside.

FIG. 1 is a conceptual diagram of an example environment 100 in which an access gateway system (AGS) 120 may operate, according to embodiments of the present disclosure. "Policies" as used herein may refer to rules governing overall permission access to a computer resource and/or granular permission to read, use, modify, and/or delete, etc., various portions or aspects of the computer resource. A "computer resource" as used herein may refer to computational resources (e.g., a hosted computer service for executing applications and/or other workflows), data (e.g., proprietary, confidential, personal, and/or classified data), applications (e.g., software as a service), to another system (e.g., use of a cloud computing platform), and/or to computer-controlled electronic, electric, and/or mechanical systems (e.g., for remotely controlling utility, civil, and/or network infrastructure) etc.

Figure 7:
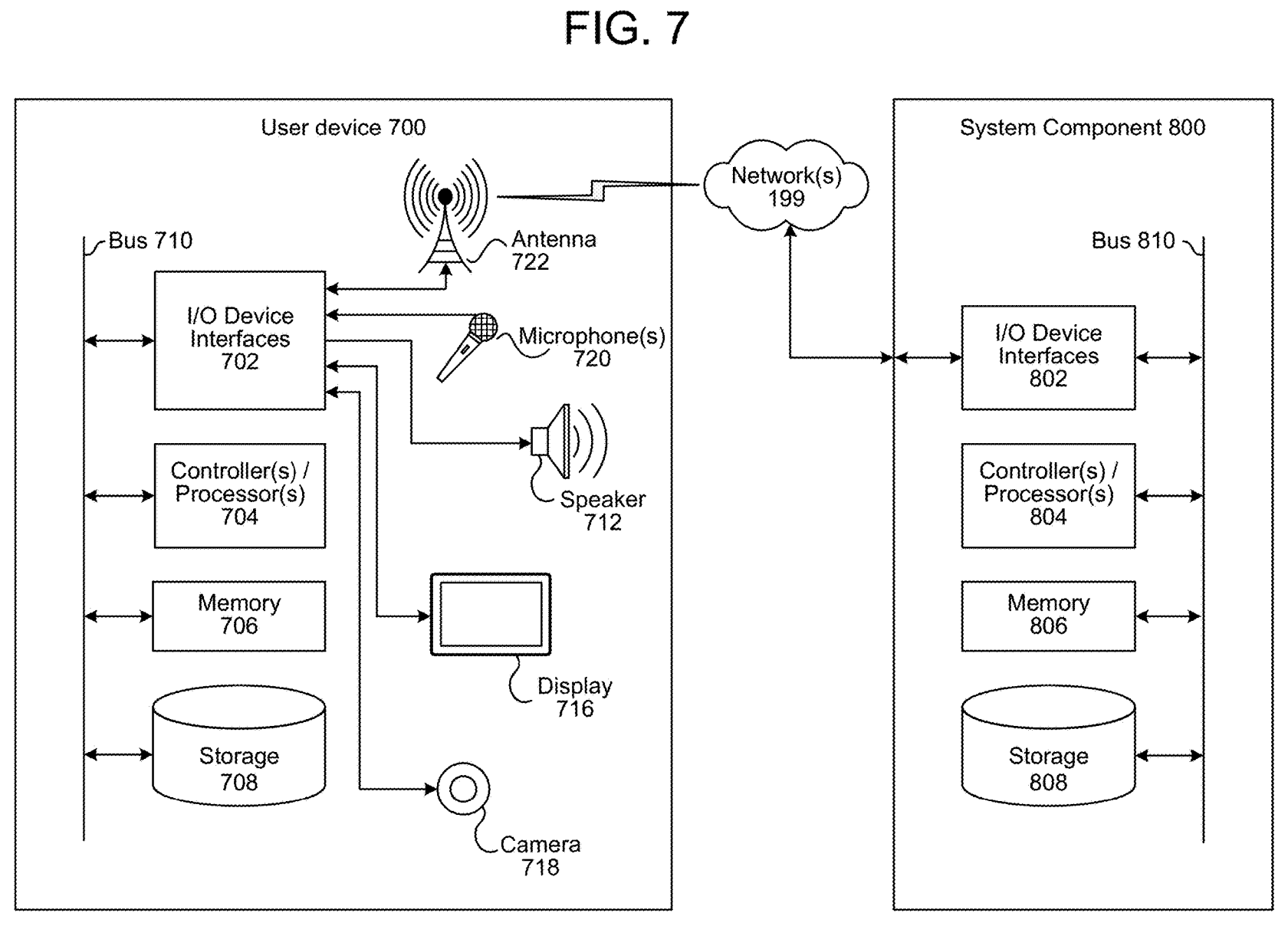

A requestor 5 operating a client device 110 may use credentials 105 provided by an identity provider system 150 to generate and send a request 135 to the AGS 120. The request 135 may be for access to a computer resource such as a resource system 130 and/or associated resource data storage component 140. The request 135 may include and/or be accompanied by a proof that the requestor 5 possesses the credentials 105. The client device 110 may be, for example, a computing device (e.g., a user device 700 and/or a system component 800 as described below with reference to FIG. 7) and/or software executing on such a computing device. The AGS 120, resource system 130, distributed nodes 160, and/or identity provider system 150 may be (and/or execute on) one or more system components (e.g., the system components 800). In some implementations, one or more of the AGS 120, resource system 130, distributed nodes 160, and/or identity provider system 150 may be (and/or execute on) one or more user devices 700. Similarly, in some implementations, the client device 110 may be (and/or execute on) one or more system components 800. In various implementations, various components and/or the functions they perform may be duplicated, divided, and/or shared among user device(s) 700 and/or system component(s) 800. The various user devices 700 and system components 800 implementing the client device 110, AGS 120, resource system 130, resource data storage component 140, identity provider system 150, and/or distributed nodes 160 may communicate over one or more wired and/or wireless computer networks 199 as shown in FIG. 7.

The AGS 120, upon verifying that the requestor 5 has proven possession of the necessary credentials, may grant the requestor 5 access to the computer resource. As used herein, the computer resource may refer to the resource system 130, the resource data storage component 140, or both. Similarly, access to a resource system 130 may, unless otherwise specified, refer to access to the resource system 130 itself, access to the resource data storage component 140, or both. The resource system 130 may be, for example and without limitation, a computer system such as a hosted computing service, and/or a data owner such as a secured data system. In some implementations, the AGS 120 may act as a secure gateway between the resource data storage component 140 and the resource system 130 (e.g., creating additional security for data in the resource data storage component 140 above and beyond security imposed by and/or for use of the resource system 130). Thus, the AGS 120 may control access to the operation of the resource system 130 and/or access to the resource data itself 140.

The identity provider system 150 may create credentials 105 for an authenticated requestor 5 (e.g., an individual who has established a certain identity or attribute). A credential 105 may be data indicating an attribute or attribute(s) of the requestor 5. The credential(s) 105 may be encrypted. The identity provider system 150 may verify an attribute of a requestor 5 and/or bestow the attribute on the requestor 5, and provide the corresponding credential(s) 105 to the requestor 5. For example, the credential 105 may be data representing a particular requestor's (and/or group of requestors') identity. In another example, the credential 105 may correspond to a characteristic of the requestor 5 (e.g., the requestor is over the age of 18, has a certain professional qualification, and/or resides in a certain location, etc.). The requestor 5 may store the credential(s) 105 in a credentials wallet 112, which may be a secure and/or encrypted memory or storage, and from which the requestor 5 can retrieve the credential(s) 105 for purposes of generating a proof to be verified by the AGS 120.

The resource system 130 may create policies 115 that specify who has permission to access it (including the data in the resource data storage component 140) and, in some cases, what types of access a particular requestor 5 has. The policies 115 may correspond to a particular identity and/or attribute as reflected in a credential 105. In some implementations, a resource system 130 may select an identity provider system 150 based on the type or types of credentials 105 the identity provider system 150 can issue. A resource system 130 may additionally or alternatively select an identity provider system 150 based other information such as security protocols it has in place, third-party evaluation of its services and/or security, reputation in the industry, etc. The resource system 130 may draft policies 115 based on the types and/or schema of credentials 105 offered by the identity provider system.

A policy 115 may be data indicating access to perform a certain type or types of operations with respect to the resource system 130 and/or the resource data storage component 140. In some cases, the policy 115 may indicate permission to access all aspects of the resource system 130 and/or the resource data storage component 140. IN some cases, the policy 115 may indicate granular permissions to access a subset of functions of the resource system 130 and/or a subset of data in the resource data storage component 140. The policy 115 may additionally indicate a credential or credential(s) 105 corresponding to the permission indicated in the policy 115. The resource system 130 may publish the policies 115 in a distributed ledger system 165 made up of distributed nodes 160a, 160b, 160c, etc. (collectively "distributed nodes 160"). The distributed nodes 160 may use a consensus algorithm to ensure the data stored by the distributed nodes 160 is reliably replicated among them.

The distributed nodes 160 may implement a distributed ledger system 165. A distributed ledger represents a shared, replicated, and synchronized data store. The distributed nodes 160 may execute a consensus algorithm to determine the correct updated ledger to represent the addition of new data (e.g., following receiving a new policy 115 from the resource system 130). The distributed nodes 160 may form a peer-to-peer network (e.g., within and/or across the computer network 199) to propagate updates once the correct updated ledger is determined. Each distributed node 160 will then update itself accordingly. The result is a tamper resistant record of the received data replicated across multiple nodes and without a single point of failure.

The distributed ledger may be a linear data structure (e.g., a chain such as blockchain) or a more complex structure like a directed acyclic graph. A directed acyclic graph in the context of a distributed ledger may be made up of blocks of data and edges indicating adjacency of data blocks added to the distributed ledger. Each edge is directed, indicating a direction from an existing data block to a new data added to the existing data block. The structure is acyclic in that it contains no paths by which a data block can be crossed twice by traversing any sequence of edges according to their direction (e.g., no edges are directed "backwards" in time). A data block may, however, have multiple edges directed to it and/or away from it.

The consensus algorithm may be a proof-of-work algorithm or a proof-of-stake algorithm. A proof-of-work algorithm is a form of cryptographic proof a party can use to prove to others that it has performed a certain about of computational work. The proof is asymmetric in that a verifier may confirm the proof with minimal computational effort. An example of proof-of-work in the context of distributed ledgers is "mining" for cryptocurrency, where mining refers to the incentive structure used to encourage nodes to expend computational effort to add data blocks to the distributed ledger. In contrast, proof-of-stake protocols only allow nodes owning some quantity of data blocks (e.g., blockchain tokens) to validate and add new data blocks. Proof-of-stake protocols prevent attackers from hijacking validation by requiring an attacker to acquire a large proportion of data blocks. Proof-of-stake protocols include, for example, committee-based proof of stake, delegated proof of stake, liquid proof of stake, etc.

Distributed ledgers may be permissioned or permissionless. A permissioned distributed ledger may refer to a private system having a central authority for authorizing nodes to add data blocks. In some cases, a consortium may agree to operate a distributed ledger jointly among the participating organizations while excluding others. A permissionless distributed ledger may refer to an open or public network for which no access control is used. Any party may add to the distributed ledger, provided they satisfy the consensus algorithm (e.g., proof of work). An example of a permissionless distributed ledger is bitcoin and other cryptocurrencies that require new entries include a proof of work.

In some implementations, the distributed nodes 160 may be open (e.g., viewable by the public) to allow an observer 15 to see which policies 115 correspond to which credentials 105. Thus, the observer 15 may have a reliable indication of which requestors 5 have authorization to perform various actions with respect to the resource system 130. In some implementations, the AGS 120 may allow a requestor 5 to provide a zero-knowledge proof of its credentials 105. This may allow the requestor 5 to keep its exact identity hidden from the AGS 120 and/or observer(s) 15 while still providing some assurance to the AGS 120 that a trusted party is requesting access to the resource system 130 and/or to the observer(s) 15 that the party that accessed the resource system 130 is a trusted party.

A zero-knowledge proof allows a party to prove a claim without revealing any additional information. For example, a "prover" can share a proof of the claim with a "verifier" who can verify the accuracy of the proof. A zero-knowledge proof may not prove the claim with certainty, but the acts of proving and verifying may be repeated until the prover demonstrates to the verifier (and, in some case, an external observer or observers) a sufficiently high statistical likelihood that the claim is true, rather than a series of lucky guesses. A physical-world analogy would be a verifier writing a string of random characters on a piece of paper and inserting it into a lockbox. A prover could prove they know the combination to the lockbox by opening it out of view of the verifier and reading the string back to the verifier. The verifier could be confident the prover knows the combination to the lockbox, but the verifier has not learned any other information that it could use to determine the combination itself.

A zero-knowledge proof of a claim may satisfy three properties: completeness, soundness, and zero-knowledge. Completeness means that if the claim is true, an honest prover can convince an honest verifier of the claim. Soundness means that if the claim is false, no cheating prover can convince an honest verifier of the claim (e.g., except for some very small probability, which may be reduced by further iterations of proof). Zero-knowledge means that if the claim is true, no verifier (or observer) will learn anything other than the fact that the claim is true.

A zero-knowledge proof may be interactive or non-interactive. An interactive proof system may involve a repeated exchange of messages between the prover (e.g., the client device 110) and the verifier (e.g., the AGS 120). It may be assumed that the client device 110 has access to abundant computational resources but cannot be trusted. In contrast, the AGS 120 may be assumed to be trustworthy but have limited computational resources. The interactive proof system may also involve an ability of the AGS 120 to make random choices. Through an exchange of messages, the client device 110 may establish a near-certain likelihood that its claim is true, without divulging any information beyond the fact of the truth of the claim. For example, the AGS 120 may determine that receiving N consecutive verifiable proofs from a client device 110 makes the probability that the client device 110 is asserting a false claim exceedingly low. The AGS 120 and/or the identity provider system 150 may select a value of N and/or a threshold confidence score (e.g., corresponding to a likelihood that the client device 110 possesses the credentials 105 it asserts) based on, for example, the potential harm of a bad actor accessing the resource system 130 and/or the sensitivity of the data in the resource data storage component 140. An example of a zero-knowledge protocol that may be used to perform an interactive zero-knowledge proof is a zero-knowledge Scalable Transparent Argument of Knowledge (zk-STARK); however, some versions of zk-STARK may operate non-interactively.

A non-interactive zero-knowledge proof may offer advantages over interactive proofs. For example, a non-interactive proof may be used when the prover and verifier cannot interact (e.g., communicate in real time). Thus, non-interactive proofs may be useful in decentralized systems such as the distributed ledger system 165 made up of the distributed nodes 160. The distributed nodes 160 may use the zero-knowledge proof to verify transactions (e.g., adding new policies 115 to the ledger) without oversight of a central authority. For example, a distributed node 160 may verify that the identity provider system 150 (and/or other component of the system) is authorized to write policies 115, public keys, and/or other data to the distributed ledger system 165. An example of a non-interactive zero-knowledge protocol is a zero-knowledge Succinct Non-interactive Argument of Knowledge (zk-SNARK). A zero-knowledge proof protocol (e.g., such as zk-SNARK, zk-STARK, and/or others) may be transparent and/or universal. A transparent protocol is one that does not require a trusted setup but may rely on public randomness. A universal protocol is one that does not require a separate trusted setup for each arithmetic circuit, where an arithmetic circuit represents a directed acyclic graph involving the addition and/or multiplication of numbers; for example, to compute a polynomial.

In some implementations, the identity provider system 150 may provide a trusted setup for the zero-knowledge proof. In some implementations, a different component (e.g., independent of the identity provider system 150, client device 110, and AGS 120) may provide the trusted setup; however, in the example environment 100 shown in FIG. 1, the identity provider system 150 is shown as providing the trusted setup for the sake of simplicity.

The identity provider system 150 may send prover setup 125a to the client device 110 and verifier setup 125b to the AGS 120. The prover setup 125a and the verifier setup 125b may be collectively referred to as the "trusted setup 125". In some implementations, the prover setup 125a may be data representing, for example, a prover key and/or a structured reference string. In some implementations, the verifier setup 125b may be data representing, for example, a verifier key and/or a structured reference string. The trusted setup 125 may facilitate the zero-knowledge proof between the client device 110 (e.g., the prover) and the AGS 120 (e.g., the verifier). A zero-knowledge proof may be used by the requestor 5 to establish to the AGS 120 that the requestor 5 possesses credentials 105 that correspond to policies 115 for access of the resource system 130. By using the zero-knowledge proof, the requestor 5 may keep their exact identity hidden from the AGS 120 and/or any observer(s) 15 of the data passed between the client device 110 and the AGS 120. The observer 15 may, however, be permitted to witness the operation(s) performed and/or the results thereof, and see that the AGS 120 authorized the operation(s) based on a policy 115 that may also be visible to the observer 15. The AGS 120 may therefore balance the interests of privacy for the requestor 5 and trust on the part of the observer 15.

The following example illustrates example operations of implementing a trusted setup 125 and verifying a zero-knowledge proof. The requestor 5 may authenticate the client device 110 with the identity provider system 150 by various means (e.g., username and password, multifactor authentication, etc.). The identity provider system 150 may provide one or more credentials 105 to the client device 110. The client device 110 may store the credential(s) 105 in the credentials wallet 112. The credentials wallet 112 may be a secure (e.g., encrypted) data storage component on and/or associated with the client device 110. The credential 105 may correspond to one or more attributes about (or assigned to) the requestor 5. For each attribute ("att"), the identity provider system 150 ("IdP") may send to the client device 110:

$$\sigma_{att} = sign_{pk(IdP)}\left(att \,\|\, pk_{Requestor}\right)$$

The requestor 5 may wish to prove a claim c about an attribute; for example, that the requestor 5 is over the age of 18, the requestor 5 is a member of organization ABC, the requestor 5 is authorized to read the contents of the resource data storage component 140, the requestor 5 has been granted Tier-2 access but not Tier-1 access, etc. The requestor 5 may prove to the AGS 120 that c(att) is true, that the identity provider system 150 certifies that the requestor 5 has the attribute att, and that att was signed (e.g., that att was used to assert claim c).

The requestor 5 may fetch the prover setup 125a from the identity provider system 150. The prover setup 125a may represent a prover key for the corresponding claim $PK_{IdP,c}$ and a structured reference string $SRS_{IdP}$.

Using the prover setup 125a, the client device 110 may build the following proof:

$$P_{att,Requestor,IdP} = \text{Proof}(\sigma_{att} \text{ is valid and } c(att) == \text{true}, PK_{IdP,c}, SRS_{IdP}$$

Which verifies that:

$$\text{verify}\left(\sigma_{att,}att \,\|\, pk_{Requestor}\right) == \text{true and } c(att) == true)$$

The client device 110 may send the proof $P_{att,Requestor,IdP}$ to the AGS 120. The AGS 120 may fetch the verifier setup 125b from the identity provider system 150. The verifier setup may represent a verifier key for the corresponding claim $VK_{IdP,c}$ and a structured reference string $SRS_{IdP}$. The AGS 120 may then verify the proof P from the client device 110:

$$Verify\,(P_{att,Requestor,IdP},\, VK_{IdP,c},\, SRS_{IdP}) == \text{valid}$$

If the requestor's claim c accurately represents the requestors credential(s) 105, the proof P will establish that c(att) is true and/or that the identity provider system 150 assigned att to the requestor 5.

Once the AGS 120 has verified the requestor's proof, the AGS 120 may retrieve the corresponding policy 115 from one or more of the distributed nodes 160 over the computer network 199. The AGS 120 may allow the requestor 5 access to the resource system 130 as indicated by the policy 115. For example, the policy 115 may indicate that the credential 105 corresponds to complete access to the resource system 130, to only certain acts (e.g., read but not write or delete), and/or to a certain subset or subsets of components of the resource system 130 or data in the resource data storage component 140. For example, components (e.g., subsystems) and/or data may be organized into tiers, with a policy 115 indicating access to Tier-3 components and/or data but not to Tier-2 or Tier-1. FIGS. 3A, 3B, 4A, and 4B illustrate examples of different types of resource systems 130 that may be accessed using the AGS 120.

An additional benefit of using a zero-knowledge proof is that the AGS 120 may approve requests 135 "offline"; that is, without a real-time connection to the identity provider system 150 and/or the distributed nodes 160 (provided the AGS 120 has cached policies 115 previously retrieved from the distributed ledger system 165). This may be useful in high-security applications in which the client device 110, AGS 120, and/or resource system 130 are "air gapped" from the wider Internet, yet the identity provider system 150 and/or distributed ledger system 165 are outside of this gap. It may also be useful in situations in which the resource system 130 is to remain available despite power and/or network connectivity interruptions in the wider computer network 199.

Figure 2:
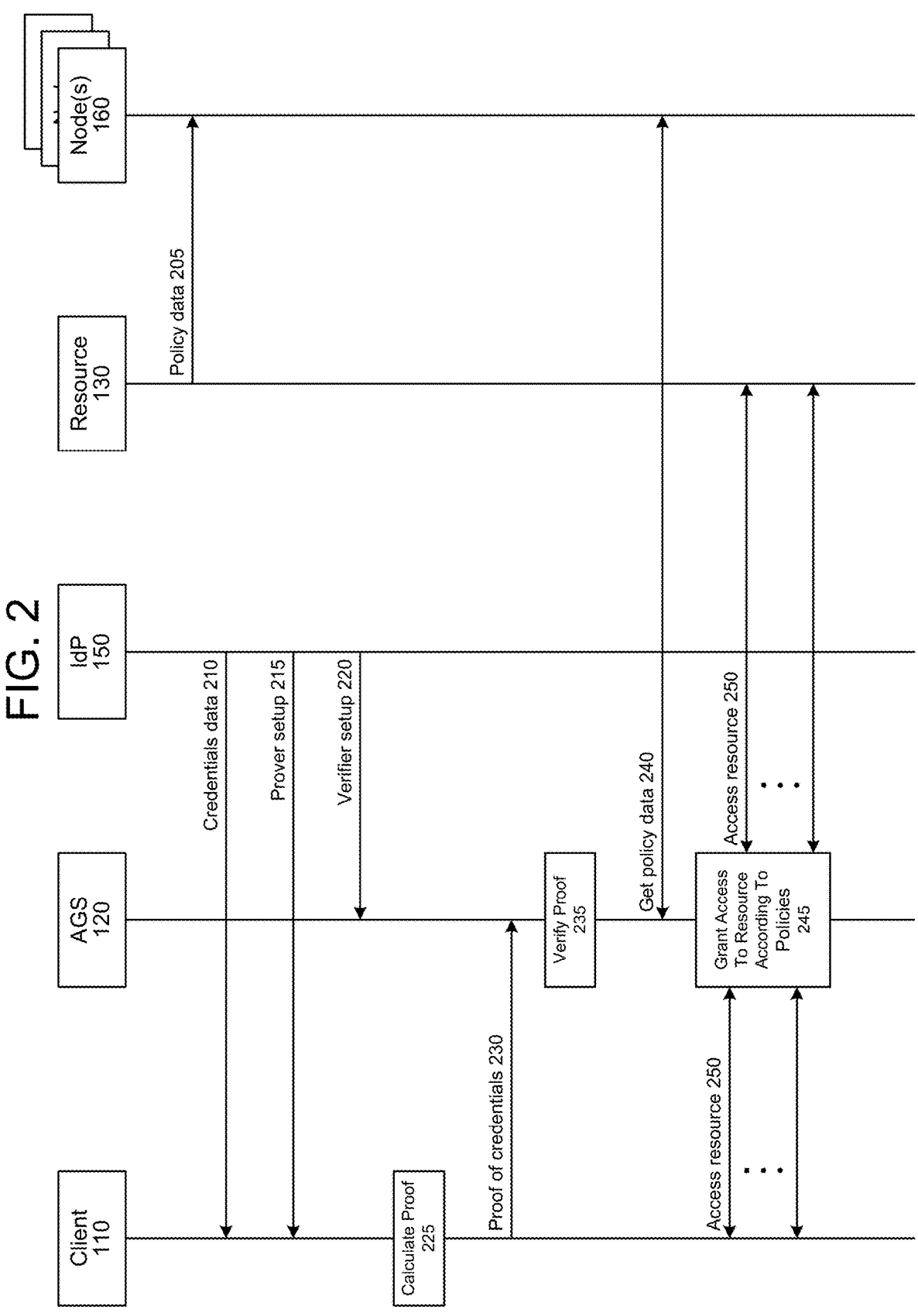
FIG. 2 is a signal flow diagram illustrating example operations of the access gateway system, according to embodiments of the present disclosure.

FIG. 2 is a signal flow diagram illustrating example operations of various components of the example environment 100 including the AGS 120, according to embodiments of the present disclosure. The resource system 130 may create policies 115 that indicate resource access corresponding to certain credentials 105, and the identity provider system ("IdP") 150 may provide such credentials 105 to authenticated requestors 5. For example, if a client device 110 proves to the AGS 120 that is has an attribute as represented by a credential 105, the AGS 120 may retrieve the corresponding policy 115 and authorize the corresponding access. The resource system 130 may send (205) policy data to one or more of the distributed nodes 160. The identity provider system 150 may send (210) the associated credentials data to the client device 110; for example, subject to authentication of the client device 110.

In some implementations, the identity provider system 150 may provide a trusted setup 125 for a zero-knowledge proof between the client device 110 and the AGS 120. In some implementations, a different system or component may provide the trusted setup 125. In some implementations, the zero-knowledge proof may be made using a transparent protocol (e.g., without a trusted setup). In the example operations shown in FIG. 2, however, the identity provider system 150 may send (215) a prover setup 125a to the client device and send (220) a verifier setup 125b to the AGS 120.

To establish the possession of a credential and/or an attribute, the client device 110 may calculate (225) a proof (e.g., using the credentials 105 and an appropriate protocol). In some implementations, the client device 110 may calculate the proof using the prover setup 125a including, for example, a structured reference string and/or a prover key. The client device 110 may send (230) the proof of credential (s) and/or attribute(s) to the AGS 120. The AGS 120 may verify (235) the proof using a protocol consistent with the client device's proof In some implementations, the AGS 120 may verify the proof using the verifier setup 125b including, for example, a structured reference string and/or a verifier key.

Upon verifying the proof, the AGS 120 may retrieve (240) policy data corresponding to the credential(s) and/or attribute(s) from one or more of the distributed nodes 160. The AGS 120 may grant (245) the client device 110 access to the resource system 130. The AGS 120 may open a connection between the client device 110 and the resource system 130. In some implementations, the AGS 120 may serve as a proxy via which the client device 110 communicates with the resource system 130. In some implementations, the AGS 120 authenticates the client device 110, which may proceed to communicate with the resource system 130 without further involvement of the AGS 120. In some implementations, the access granted to the requestor 5 may include all complete access to all features/functions of the resource system 130. In some implementations, however, policies may specify granular permission for only individual or subsets of features/functions of the resource system 130 and/or associated data (e.g., as stored in a resource data storage component 140). The client device 110 may access (250) the resource system 130 to the extent authorized by the AGS 120.

Figure 3A:
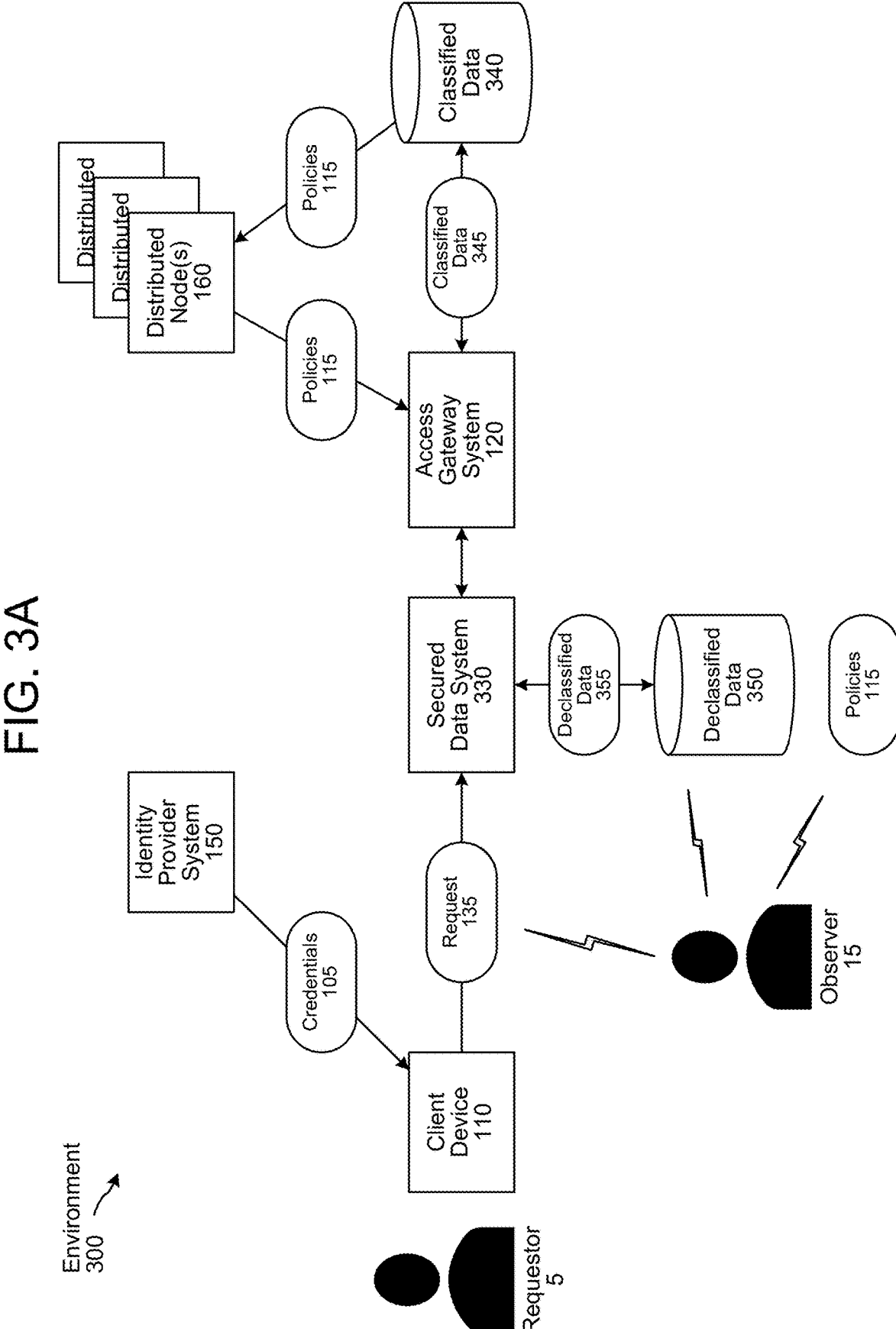
FIG. 3A illustrates operations of a first example use case of the access gateway system for declassifying data, according to embodiments of the present disclosure.

FIG. 3A illustrates operations of a first example use case of the AGS 120 for declassifying data, according to embodiments of the present disclosure. The first example use case may occur in an environment 300, shown in FIG. 3A, in which the AGS 120 serves as a secure gateway between a classified data storage component 340 and a secured data system 330 and/or a declassified data storage component 350. In various implementations, the secured data system 330 may include and/or communicate with the classified data storage component 340 and the declassified data storage component 350. The classified data storage component 340 may be a repository of classified data 345 and be subject to heightened data security protocols including authentication, encryption, access logging, etc. The declassified data storage component 350 may be a repository of data that is unclassified or declassified (e.g., declassified data 355). the declassified data storage component 350 may be public or may have less restrictive data security protocols in place than the classified data storage component 340.

A requestor 5 may send a request 135 to the AGS 120 for access to the classified data 345 stored in the classified data storage component 340. The AGS 120 may serve as an extra layer of security for the classified data storage component 340. The AGS 120 may also serve as an intermediary that can verify whether the policies 115 grant a requestors 5 access to the classified data 345, while keeping the requestor's exact identity hidden to an observer 15. If data is declassified, however, the observer 15 may be able to see the declassified data 355, the policies 115, and/or a record of the declassification, and trust that declassification occurred by an appropriate authority and through proper procedures.

Figure 3B:
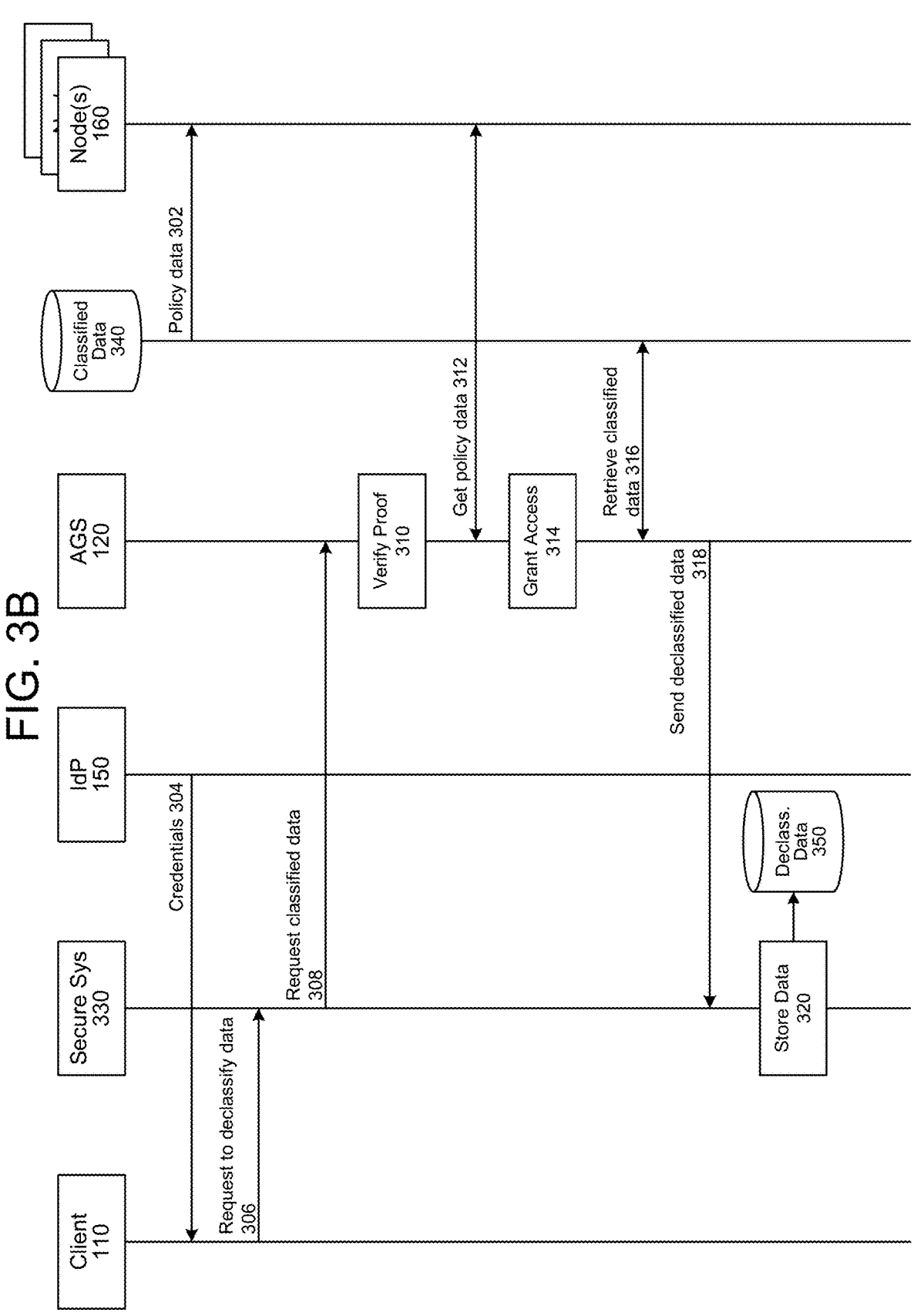
FIG. 3B is a signal flow diagram illustrating example operations of the first example use case, according to embodiments of the present disclosure.

FIG. 3B is a signal flow diagram illustrating example operations of the first example use case, according to embodiments of the present disclosure. The resource system 130 may create policies 115 that indicate resource access corresponding to certain credentials 105, and the identity provider system 150 may provide such credentials 105 to authenticated requestors 5. The policies 115 may correspond to, for example, access to view classified data 345 and/or to declassify the classified data 345. The classified data storage component 340 (e.g., an owner of the classified data 345) may create and send (302) policy data to one or more of the distributed nodes 160. The identity provider system 150 may send (304) credentials data to the client device 110; for example, subject to authentication of the client device 110. The requestor 5 may request access to the classified data 345. Accordingly, the client device 110 may send (306) a declassification request 135 to the secured data system 330. The declassification request 135 may be accompanied by a proof of credential(s) and/or attribute(s), or the proof may be calculated and sent separately. The secured data system 330 may send (308) a request to the AGS 120 for the classified data. The AGS 120 may verify (310) the proof. Calculation and verification of proof may occur by one or more of the techniques previously described.

Upon verifying the proof, the AGS 120 may retrieve (312) policy data corresponding to the credentials from one or more of the distributed nodes 160. The AGS 120 may grant (314) access as indicated by the policy data. If the requested operation is authorized, the AGS 120 may retrieve (316) the classified data 345 from the classified data storage component 340. In some implementations, the classified data storage component 340 may encrypt the classified data 345 prior to sending to the AGS 120 (e.g., as described below with reference to FIGS. 6A and 6B). The AGS 120 may send (318) the now-declassified data 355 to the secured data system 330. The secured data system 330 may store (320) the declassified data 355 in the declassified data storage component 350 as declassified data 355.

Figure 4A:
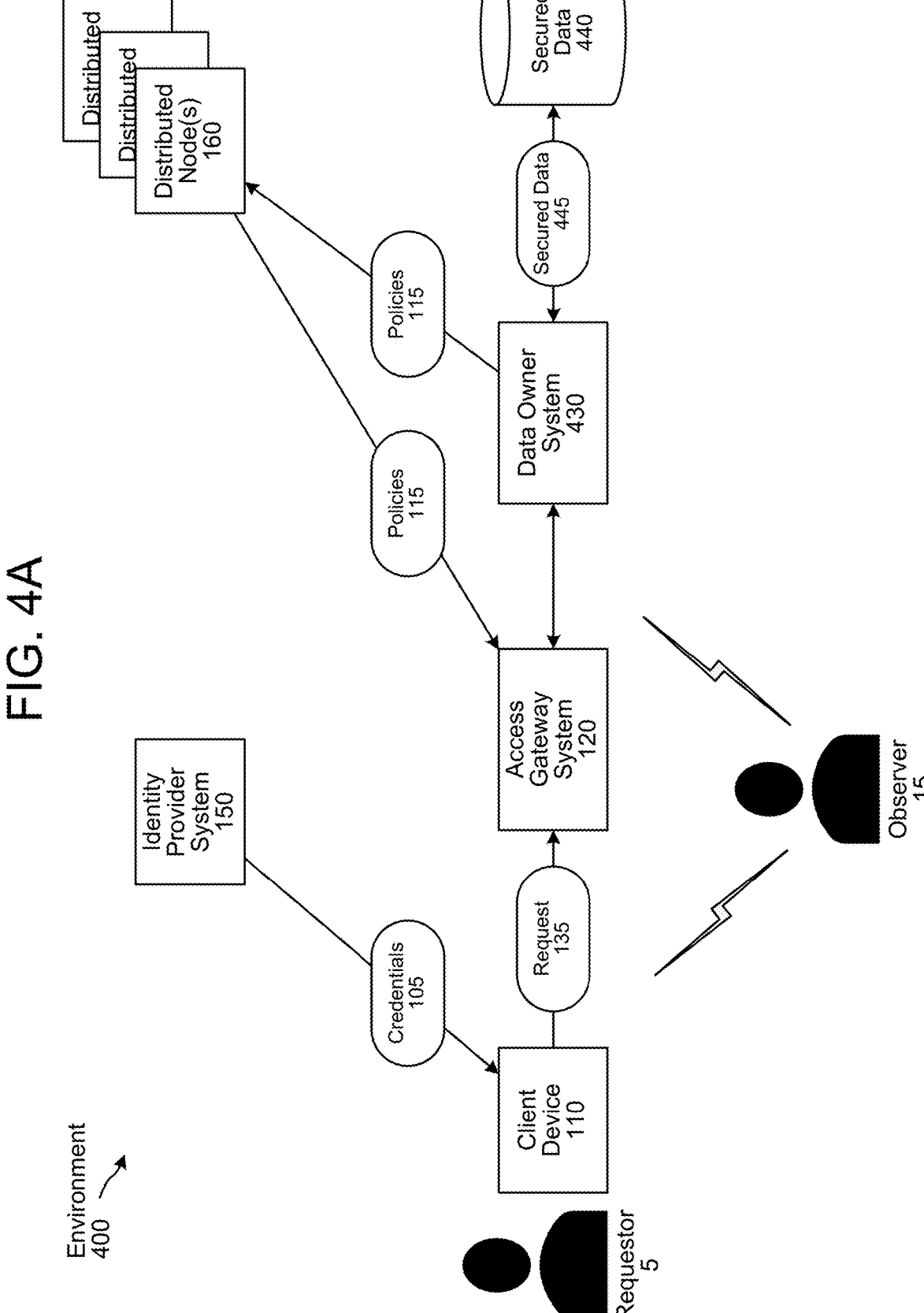
FIG. 4A illustrates operations of a second example use case of the access gateway system for authorizing access to secured data for executing workflows on a data owner system, according to embodiments of the present disclosure.

FIG. 4A illustrates operations of a second example use case of the AGS 120 for authorizing access to secured data 445 for executing workflows on a data owner system 430, according to embodiments of the present disclosure. The second example use case may occur in an environment 400, shown in FIG. 4A, in which the AGS 120 serves as a gateway interface to computer resources such as a data owner system 430 and/or a secured data storage component 440. The data owner system 430 may include and/or communicate with the secured data storage component 440. The secured data storage component 440 may be a repository of confidential, sensitive, or otherwise proprietary data and be subject to heightened data security protocols including authentication, encryption, access logging, etc. The AGS 120 may grant a requestor 5 access to execute workflows on the data owner system 430 using the secured data 445. In this manner, the AGS 120 may act as a manager between data analysts (e.g., the requestor 5) and the data owner system 430 to regulate which programs and/or data may be exchanged.

In some implementations, the data owner system 430 may delegate authentication of requestors 5 to the identity provider system 150. The identity provider system 150 may thus be delegated with verifying attributes of a requestor 5 and providing the requestor with credentials 105. In some implementations, the data owner system 430 may act as its own identity provider system and provide credentials 105 to authenticated requestors 5. The data owner system 430 may create policies 115 specifying permissions corresponding to the credentials 105 and record the policies 115 to one or more of the distributed nodes 160, which may store the policies 115 in a distributed ledger such as a blockchain. The identity provider system 150 may provide credential 105 to an authenticated requestor 5. The identity provider system 150 may send the credential 105 to a client device 110 that has established authorization to request workflow execution corresponding to the policy 115, as previously described.

A requestor 5, operating the client device 110, may request an action (e.g., a workflow to be executed by the data owner system 430 using secured data 445) by sending a request 135 to the AGS 120. The request 135 may include or accompany a proof of the credential 105. The AGS 120 may verify the proof and retrieve the corresponding policy 115 from one or more of the distributed nodes 160. The AGS 120 may then authorize the client device 110 to access the secured data 445 and/or request workflow execution on the data owner system 430. The data owner system 430 may execute the workflow and return results data to the client device 110 and/or provide the results data to a different component or system.

In some implementations, the AGS 120 may verify a request 135; for example, to determine whether the credential(s) 105 provided authorize execution of the requested action and/or access to the requested secured data 445. The AGS 120 may analyze the workflow to determine whether the operations (or particular combinations of operations) are authorized by the policy(ies) 115. For example, the workflow may be a computer executable program. In some implementations, the AGS 120 may generate an abstract syntax tree of the computer executable program. A computer program may be written in a programming language (e.g., C, Java, Python). A computer program may be compiled by a compiler that translates the computer program from source code (i.e., a human understandable language) to a machine-readable language that creates a program executable by the computer. One part of the compilation process may include generating an abstract syntax tree. The abstract syntax tree may represent the structure of the source code for a given program. The structure, representation, and granularity may vary based on the source code language and the compiler. The abstract syntax tree may have nodes representing, for example, inherent operations of the programming language, variable or value nodes, and/or function nodes representing library-defined functions. In some cases, the program and/or abstract syntax tree may include user-defined functions (e.g., written by a requestor using the library-defined functions).

The action request 135 from the client device 110 may include the compiled program and/or the abstract syntax tree. The AGS 120 may validate the library- and/or user-defined functions against those permitted by the policy(ies) 115 stored in the distributed nodes 160. For example, the AGS 120 may traverse the abstract syntax tree to identify the functions used in the program and validate that the functions are permitted by cross referencing the functions against the functions in the one or more permitted lists. For example, a function library may provide a function such as "combine (int a, int b)" that adds the two parameters (e.g., integer a and integer b). The data analyst or developer may prefer to use function names they are familiar with and thus they may write a function such as "addnumbers(int c, int d)" that then calls the provided "combine" function. When the program is compiled and the abstract syntax tree is generated, different naming conventions (such as "addnumbers") are removed to construct the base operations of the program. In other words, when "addnumbers" is called in the program, the compilation determines that this is a call for "combine" and thus "combine" is the function that is in the compiled program and the abstract syntax tree. Despite the program using "addnumbers" throughout, the compiled program reveals that the call for "addnumbers" is the same as "combine" and the AGS 120 may determine that the functions are permitted.

If the AGS 120 determines that the workflow satisfies the conditions indicated by the policy(ies) 115 (e.g., that that the policy(ies) 115 permit all functions of the program), the AGS 120 may send the workflow to the data owner system 430 for execution and/or indicate to the data owner system 430 that the requested action is valid and authorized. In some implementations, the functions attributed to the identity provider system 150 and the AGS 120 may be performed by a single component (e.g., the identity provider system 150 or the AGS 120) and/or may be shared or divided between the identity provider system 150 and the AGS 120.

Thus, the AGS 120 may provide a secure gateway between the client device(s) 110 and the data owner system 430. The AGS 120 may serve as an intermediary that can verify that the policies grant a requestor 5 access to execute workflows on the data owner system 430 while keeping exact identity of the requestor(s) 5 hidden to an observer 15. The observer 15 may, however, be able to see that data accessed and/or workflows executed were subject to proper verification of policy(ies) 115.

In some implementations, the environment 400 may include more than one AGS 120. For example, a first AGS 120 may grant a requestor access to the data owner system 430 while a second AGS 120 processes workflows to verify that they comport with permissions granted to the requestor 5. In some implementations, the environment 400 may additionally or alternatively include an AGS 120 that controls access to the secured data storage component 440 (similarly to the AGS 120 in FIG. 3A).

Figure 4B:
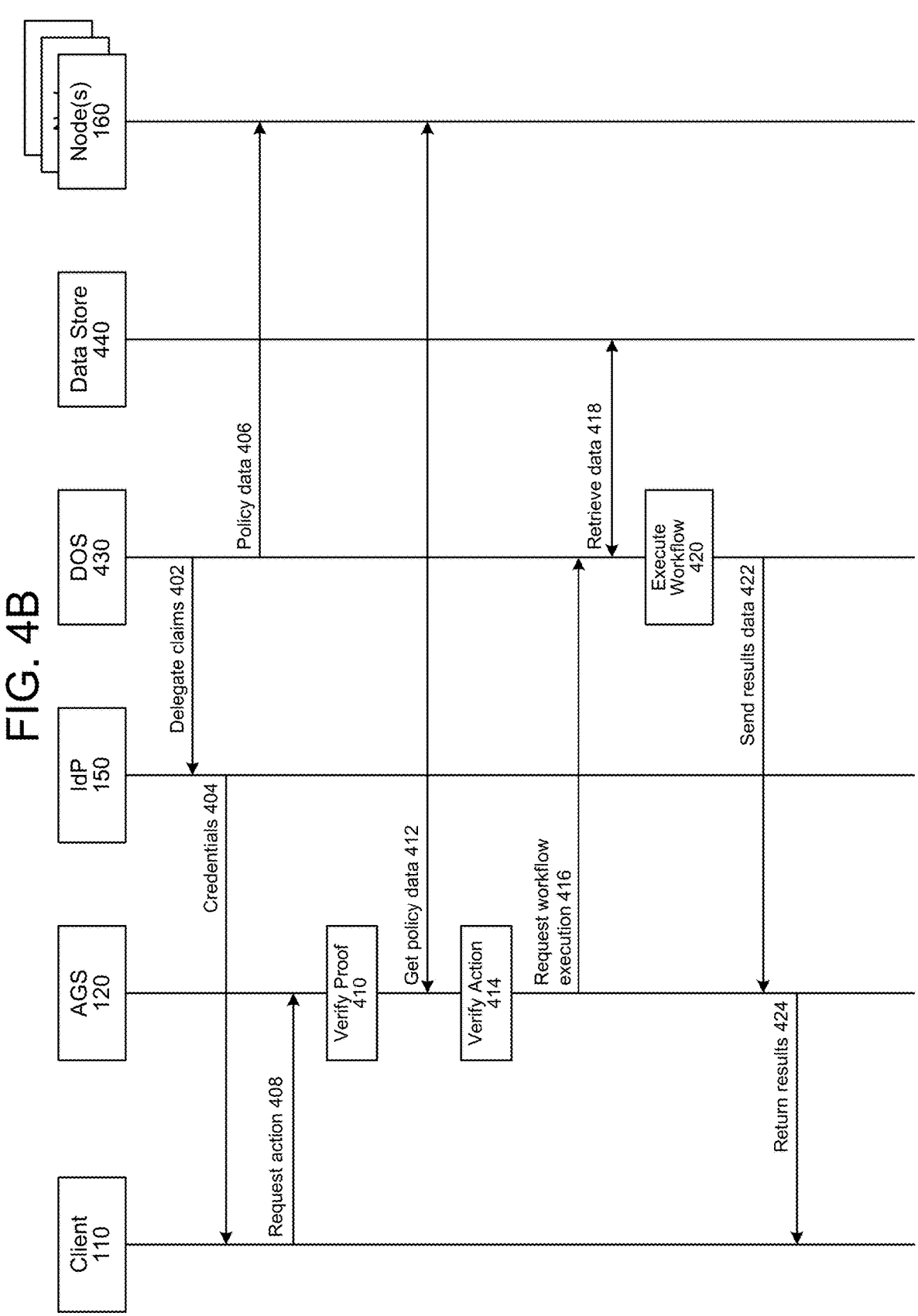
FIG. 4B is a signal flow diagram illustrating example operations of the second example use case, according to embodiments of the present disclosure.

FIG. 4B is a signal flow diagram illustrating example operations of the second example use case, according to embodiments of the present disclosure. The data owner system ("DOS") 430 may delegate (402) claims to the identity provider system 150 (or, in some implementations, the AGS 120). The identity provider system 150 may, for a claim, create an association between a policy 115 and a credential 105. The policy 115 may correspond to, for example, access to the data owner system 430, secured data 445 stored in the secured data storage component 440, and/or a defined set of instructions. The identity provider system 150 may send (404) the associated credentials data to the client device 110; for example, subject to authentication of the client device 110. The data owner system 430 may send (406) policy data to one or more of the distributed nodes 160.

A requestor 5 may request (408) performance of an action; for example to be executed on the data owner system 430 using the secured data 445. The request 135 may be accompanied by a proof of credential(s) and/or attribute(s), or the proof may be calculated and sent separately. The AGS 120 may verify (410) the proof. Calculation and verification of proof may occur by one or more of the techniques previously described. Upon verifying the proof, the AGS 120 may retrieve (412) policy data corresponding to the credentials from one or more of the distributed nodes 160.

In some implementations, the AGS 120 may verify (414) a request 135; for example, to determine whether the credential(s) 105 provided authorize execution of the requested action and/or access to the requested secured data 445. The AGS 120 may analyze the workflow to determine whether the operations (or particular combinations of operations) are authorized by the policy(ies) 115.

The AGS 120 may grant access as indicated by the policy data. If the policy(ies) indicate that the requested action is authorized (e.g., all of the functions in the workflow are authorized by the policy(ies)), the AGS 120 may send (416) the request 135 for workflow execution to the data owner system 430. Upon receiving the workflow, the data owner system 430 may retrieve (418) the secured data 445 from the secured data storage component 440. The data owner system 430 may execute (420) the workflow using the retrieve data, and send (422) results data back to the AGS 120. The AGS 120 may send (424) the results to the client device 110 that requested the action and/or to another authorized recipient.

Figure 5A:
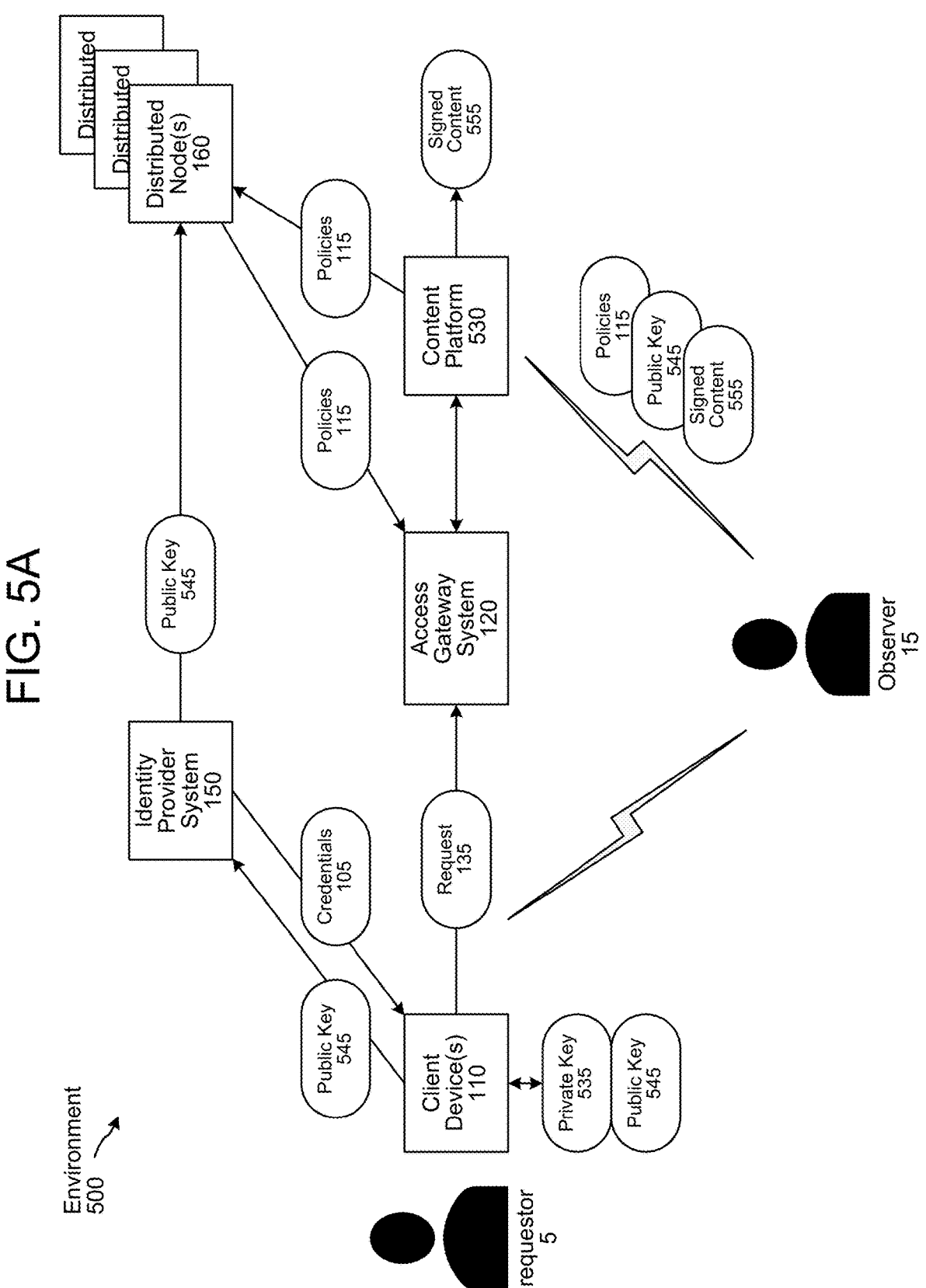
FIG. 5A illustrates operations of a third example use case of the access gateway system for authorizing submission of digitally signed content to a content platform, according to embodiments of the present disclosure.

FIG. 5A illustrates operations of a third example use case of the AGS 120 for authorizing submission of digitally signed content 555 to a content platform 530, according to embodiments of the present disclosure. The third example use case may occur in an environment 500, shown in FIG. 5A, in which the AGS 120 serves as a gateway to computing resources such as the content platform 530. The content platform 530 may be, for example and without limitation, a document hosting website and/or platform, video hosting website and/or platform, a file sharing website and/or platform, a social media website and/or platform, etc. In some implementations, the content platform 530 may make content (signed and unsigned) publicly available and/or available subject to authorization. Thus, in some cases, the third example use case may be thought of as the reverse of the first example use case: rather than the AGS 120 managing the removal of data from a repository, the AGS 120 may manage placement of data into a repository. The third use case may be useful in a scenario in which it is desirable to authenticate and authorize content uploaded to the content platform 530 while maintaining anonymity of a requestor 5 (e.g., a content creator, journalist, whistleblower, etc.).

The environment 500 may include an identity provider system 150, which may manage identities in the environment 500 (e.g., by implementing identity access management and/or know your customer guidelines). For example, the identity provider system 150 may provide an authenticated requestor 5 with credentials 105. The identity provider system 150 may also create an anonymizing account identifier for the requestor 5 (and, in some cases, additional requestors 5). The account identifier may correspond to, for example, an organization, pseudonym, anonymous and/or collectively operated social media account, etc. The identity provider system 150 and/or requestor 5 may use the account identifier to indicate a source of the content. An observer 15 may use the account identifier to determine a public key 545 for authenticating an item of signed content. The public key 545 may correspond to a private key 535 of a private key/public key pair that the requestor 5 may use to implement a digital signature. A digital signature may be an application of asymmetric cryptography in which a pair of cryptographic keys may be used for authenticating and verifying content. The requestor 5 may own the private key 535 and the corresponding public key 545. The requestor 5 may use the private key 535 and the content to generate the signed content 555. The requestor 5 may publish the public key 545 to, for example, the distributed ledger system 165. In some cases, the requestor 5 may send the public key 545 to the identity provider system 150, who may publish the public key 545 and, in some implementations, associate the public key 545 with the account identifier.

The requestor 5 may use the AGS 120 to access the content platform 530. The AGS 120 may also serve as an intermediary that can verify that the policies 115 (e.g., set by the content platform 530) grant a requestor 5 access to the content platform 530 while keeping their exact identity hidden to an observer 15. The AGS 120 may allow a requestor 5 who proves they have the proper credentials 105 to upload signed content 555. An observer 15 may be able to see the signed content 555, the policies 115, and/or the public key 545, and use the public key 545 to verify that the content was properly signed. The observer 15 can trust that the AGS 120 allowed upload of the signed content 555 subject to verifying that the uploader had proved having the proper credential 105.

In some implementations, the observer 15 may be able to determine an account identifier corresponding to the signed content 555. The observer 15 may use the account identifier to retrieve the corresponding public key 545. In some implementations, the public key 545 may be stored in the distributed ledger system 165. In some implementations, the public key may be hosted by the content platform 530. In some implementations, the identity provider system 150 may host the public key 545. The observer 15 may use the public key 545 to verify whether the signature matches the content, and thus verify that the signed content is properly attributable to the account identifier. A would-be forger, however, would not be able to find a content-signature pair that would pass verification with the public key 545. Thus, the observer 15 would be able to use the public key 545 to verify that an item of signed content 555 is authentic. The observer 15 may also trust that the AGS 120 verified the requestor's proof of credential(s) 105, and that the requestor 5 was authorized to upload the signed content 555. The observer 15 may not, however, be able to determine the exact identity of the requestor 5 using the signed content 555, the public key 545, and/or by observing any of the interactions between the requestor 5 and the AGS 120. This may allow members of an organization or other group to upload signed content 555 anonymously or semi-anonymously.

In some implementations, the identity provider system 150 may provide the credential(s) 105, the trusted setup 125 for the zero-knowledge proof, and/or the public-private key pair. In some implementations, those features/functions may be performed by different components and/or entities of the environment 500. In some implementations, the credential (s) 105 may be the same as the private key 535; for example, to upload to the content platform 530, the client device 110 may use a zero-knowledge proof to proof to the AGS 120 that the requestor possesses the private key 535 without divulging the private key 535 to the AGS 120. By nature of the digital signature scheme, when the client device 110 sends the signed content 555 to the content platform 530 via the AGS 120, the AGS 120 will not be able to determine the private key 535 from the signed content 555.

Figure 5B:
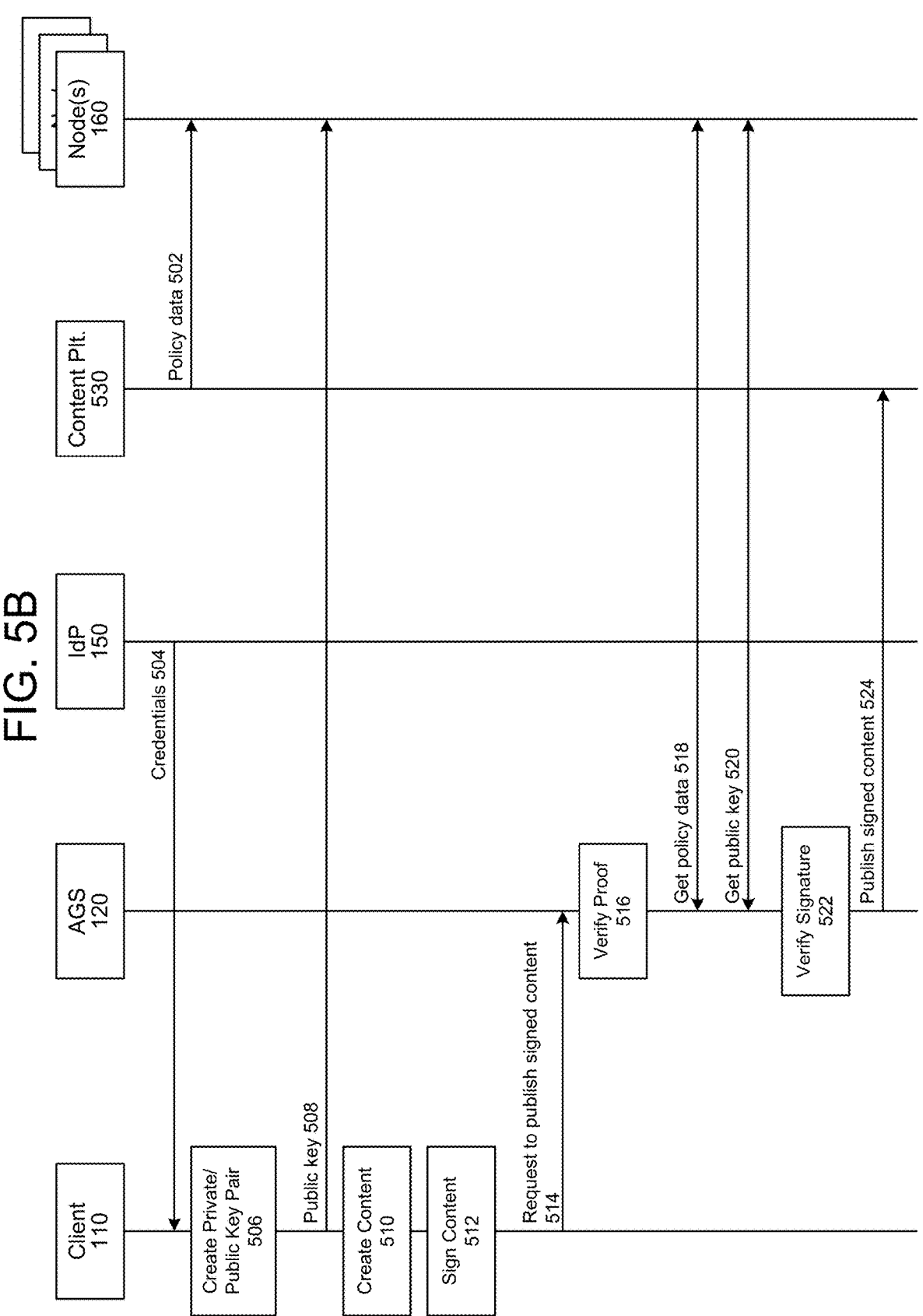
FIG. 5B is a signal flow diagram illustrating example operations of the third example use case, according to embodiments of the present disclosure.

FIG. 5B is a signal flow diagram illustrating example operations of the third example use case, according to embodiments of the present disclosure. The identity provider system 150 may create associations between a policy 115 and a credential 105. The policy 115 may correspond to, for example, authorization to use a private key 535 and/or to upload signed content 555 to the content platform 530. The content platform 530 may send (502) policy data to one or more of the distributed nodes 160. The identity provider system 150 may send (504) the associated credentials data to the client device 110; for example, subject to authentication of the client device 110. The requestor 5 may create (506) and/or obtain a public/private key pair for digitally signing content. The requestor 5 may send (508) the public key 545 to one or more of the distributed nodes 160 for recording in the distributed ledger. In some cases, the requestor 5 may send the public key 545 to the identity provider system 150, who may publish the public key 545 to the distributed node(s) 160. In some cases, the identity provider system 150 may associate the public key 545 with an account identifier.

The requestor 5 may create (510) content. The content may be, for example, a document, media file, social media post, etc. The requestor 5 may use the private key 535 to digitally sign (512) the content. Signing the content may include performing a mathematical function on the private key 535 and unsigned content to generate the digital signature, which may be added to the content. The resulting signed content 555 may be authenticated by anyone possessing the signed content 555 and the public key 545 (e.g., which they may obtain from one of the distributed nodes 160). The requestor 5 may send (514), to the AGS 120, the signed content 555 and/or a request to publish the signed content 555. The AGS 120 may verify (516) the proof. Upon verification of the proof, the AGS 120 may retrieve (518) the policy(ies) from one or more of the distributed nodes 160.

In some implementations, the AGS 120 may additionally or alternatively verify the digital signature. The AGS 120 may retrieve (520) the public key from, for example, one or more of the distributed nodes 160. In some implementations, one or both of the policy data and public key may be stored in a distributed ledger. In some implementations, the policy data and public key may be stored in the same distributed ledger; in other implementations, the policy data and public key may be stored in separate distributed ledgers. The AGS

120 may use the public key 545 to verify (522) the digital signature applied to the signed content 555. Once the AGS 120 has verified the proof and/or the digital signature, the AGS 120 may allow the client device 110 to publish (524) the signed content 555 to the content platform 530. In some implementations, the AGS 120 may send the signed content 555 to the content platform 530. In some implementations, the AGS 120 may provide the client device 110 with a token or other data that the client device 110 may use to access the content platform 530 for uploading the signed content 555 directly.

Figure 6A:
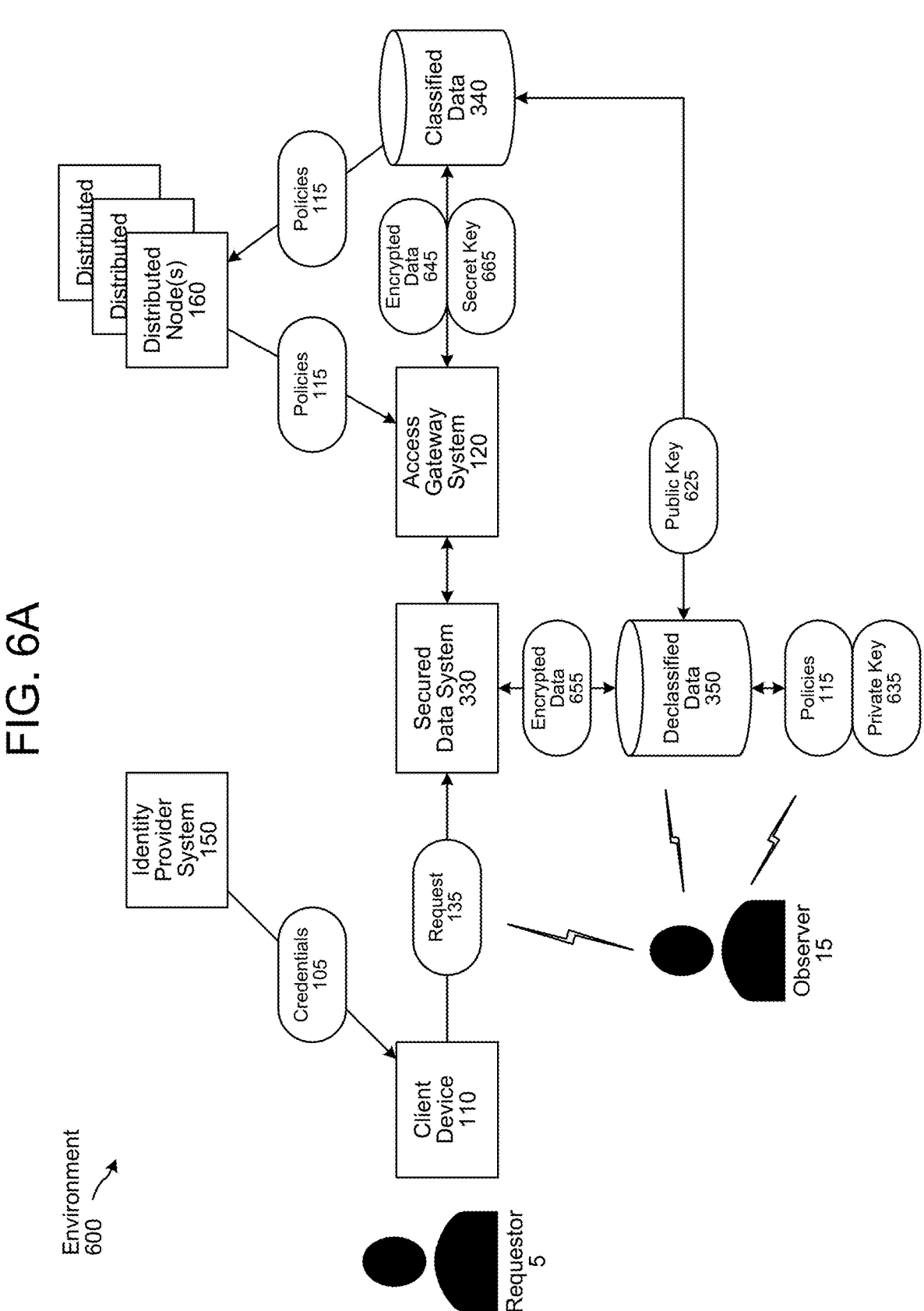
FIG. 6A illustrates operations of a fourth example use case involving encrypting declassified data prior to trans-ferring the data, via the access gateway system to a declassified data storage, according to embodiments of the present disclosure.

FIG. 6A illustrates operations of a fourth example use case involving encrypting declassified data prior to transferring the data, via the AGS 120, to a declassified data storage, according to embodiments of the present disclosure. In some implementations, the fourth example use case may represent a modification of, or an extension to, the first example use case. For example, the recipient of the encrypted declassified data 655 (e.g., the declassified data storage component 350) may provide an encryption key to the classified data storage component 340 for encrypting the classified data 645 prior to transfer to the declassified data storage component 350.

The fourth example use case may occur in an environment, shown in FIG. 6A, which may be the same as or similar to the environment 300 shown in FIG. 3A. In the environment 600, the AGS 120 may serve as a secure gateway between a classified data storage component 340 and a secured data system 330 and/or a declassified data storage component 350. The secured data system 330 may include and/or communicate with the classified data storage component 340 and the declassified data storage component 350. The classified data storage component 340 may be and/or include a repository of classified data 645. The classified data 645 may be subject to heightened data security protocols including authentication, encryption, access logging, etc. The declassified data storage component 350 may be a repository of data that is unclassified, declassified, reclassified, etc. (e.g., declassified data 655). The declassified data storage component 350 may be public or may have less restrictive data security protocols in place than the classified data storage component 340.

A requestor 5 may, using the client device 110, send a request 135 to the AGS 120 for access to the classified data 645 stored in the classified data storage component 340. The AGS 120 may serve as an extra layer of security for the classified data storage component 340. The AGS 120 may also serve as an intermediary that can verify whether the policies 115 grant a requestors 5 access to the classified data 645, while keeping the exact identity of the requestor 5 hidden to an observer 15. If data is declassified, however, the observer 15 may be able to see the encrypted declassified data 655, the policies 115, and/or a record of the declassification, and trust that declassification occurred by an appropriate authority and through proper procedures.

In some implementations, a component of the system may request that the classified data 645 be encrypted for transfer to the declassified data storage component 350. In various implementations, the request may be made by the client device 110, secured data system 330, and/or the declassified data storage component 350. If the classified data 645 is requested to be encrypted, the classified data storage component 340 may encrypt the classified data 645 prior to sending to sending the data to the AGS 120. The declassified data storage component 350 (and/or a system associated therewith) may decrypt the declassified data 655 for access by the client device 110.

In some implementations, the system may use asymmetric (e.g., public-key) cryptography to encrypt the classified data 645. Asymmetric cryptography is related to the digital signature technique used in the third use case illustrated in FIGS. 5A and 5B. In public-key cryptography, data may be encrypted/decrypted using key pairs. A key pair may be generated with a public key cryptographic algorithm (e.g., a one-way mathematical function). A key pair may consist of a public key and a private key. The public key may be used to encrypt a data. The private key may be used to decrypt the data. The public key may be made relatively readily available, while the private key may be kept secure. In this manner, anyone with the public key may encrypt data, but only an entity with the private key will be capable of decrypting it. Thus, public-key cryptography may be used by one party to allow a counter party to send it messages or other data securely, without third parties being able to understand or use the data.

In some implementations, the system may use a symmetric algorithm. In symmetric-key cryptography, data may be encrypted and decrypted using the same key. In some cases, however, the encryption and decryption keys may not be identical; rather, one key may represent a transformation of the other key. Thus, one party may use the key to encrypt data and the counter party may use the same key (or a simple transformation of it) to decrypt the data. Symmetric-key encryption may encrypt digits/characters/bytes of data one at a time (e.g., using a stream cipher) or they may encrypt data in chunks (e.g., using a block cipher). An example of a symmetric-key algorithm is the Advanced Encryption Standard (AES) algorithm, which uses a block cipher. In various implementations, the block size may be 128, 160, 192, 224, 256, etc. bits. In various implementations, the key size may be 128, 160, 192, 224, 256, etc. bits.

In some implementations, the system may use a combination of symmetric and asymmetric cryptography. For example, symmetric key encryption may be used to encrypt the data while asymmetric encryption may be used to encrypt the key used to for the symmetric encryption and decryption of the data. While symmetric-key encryption algorithms may be better for bulk encryption due to their smaller key size, it requires both parties to have the same key. This may present challenges related to sharing the key securely. Thus, in some cases, the system may use asymmetric encryption to securely a secret key for symmetric-key encryption.

In some implementations, the declassified data storage component 350 may generate a public/private key pair. The declassified data storage component 350 may send the public key 625 to the classified data storage component 340 for use in encrypting the classified data 645. The declassified data storage component 350 may retain the corresponding private key 635 and use it to decrypt the encrypted data. The declassified data storage component 350 may store the private key 635 securely to prevent entities besides the declassified data storage component 350 from decrypting the declassified data 655.

In some implementations, the classified data storage component 340 may generate an additional key for performing symmetric-key encryption (e.g., a secret key 665). The classified data storage component 340 may encrypt the classified data 645 using the secret key 665. The classified data storage component 340 may encrypt the secret key 665 using the public key 625, and send the encrypted classified data 645 to the declassified data storage component 350. The declassified data storage component 350 may decrypt the secret key 665 using the private key 635 that it has retained.

Once the declassified data storage component 350 has the decrypted the secret key 665, it may use the secret key 665 to decrypt the declassified data 655 for inspection and/or use.

Figure 6B:
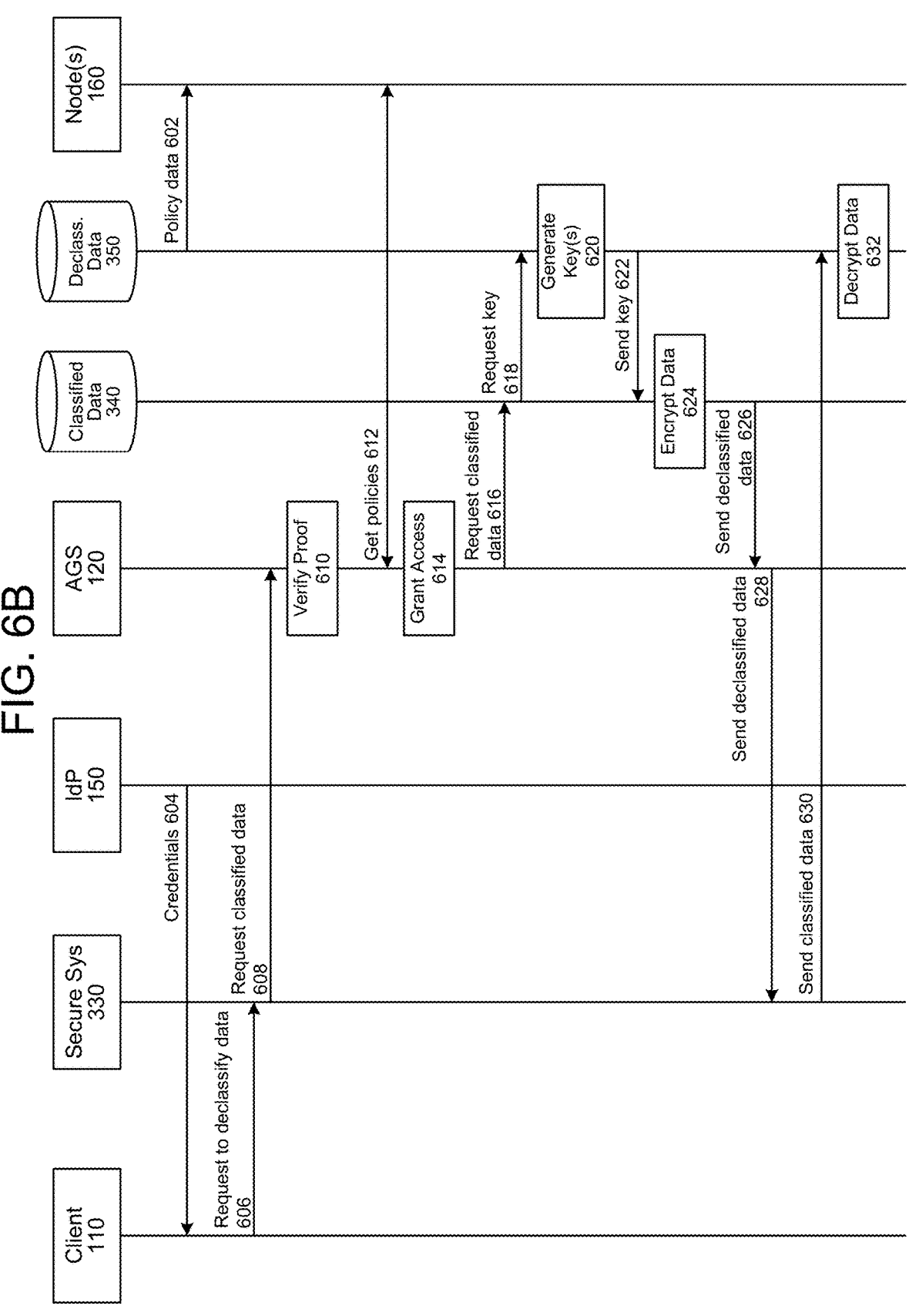
FIG. 6B is a signal flow diagram illustrating example operations of the fourth example use case, according to embodiments of the present disclosure.

FIG. 6B is a signal flow diagram illustrating example operations of the fourth example use case, according to embodiments of the present disclosure. The resource system 130 may create policies 115 that indicate resource access corresponding to certain credentials 105. The identity provider system 150 may provide such credentials 105 to an authenticated requestor 5. The policies 115 may correspond to, for example, access to view and/or declassify classified data 645. The classified data storage component 340 (e.g., an owner of the classified data 645) may create and send (602) policy data to one or more of the distributed nodes 160. The identity provider system 150 may send (604) credentials data to the client device 110; for example, subject to authentication of the client device 110. The requestor 5 may request access to the classified data 645. Accordingly, the client device 110 may send (606) a declassification request 135 to the secured data system 330. In some implementations, the declassification request 135 may be accompanied by a proof of credential(s) and/or attribute(s). In some implementations, the client device 110 may calculated and send the proof separately from the request. The secured data system 330 may send (608) a request to the AGS 120 for the classified data 645. The AGS 120 may verify (610) the proof. Calculation and verification of proof may occur by one or more of the techniques previously described. Upon verifying the proof, the AGS 120 may retrieve (612) policy data 115 corresponding to the credentials from one or more of the distributed nodes 160. The AGS 120 may grant (614) access as indicated by the policy data 115.

If the requested operation is authorized, the AGS 120 may request (616) the classified data 645 from the classified data storage component 340. In some implementations, the classified data storage component 340 may encrypt the data prior to sending it to the AGS 120. In such implementations, the classified data storage component 340 may, upon receiving the request for classified data, send (618) a request to the declassified data storage component 350 for an encryption key. The declassified data storage component 350 may generate (620) the encryption key. In some implementations, the declassified data storage component 350 may generate a public/private key pair. For example, the declassified data storage component 350 may send the public key 625 to the classified data storage component 340 for use in encrypting the classified data 645 (e.g., to generate encrypted classified data). The declassified data storage component 350 may use the corresponding private key 635 to decrypt the encrypted data. The private key 635 may be retained securely to prevent entities besides the declassified data storage component 350 from decrypting the declassified data 655. In some implementations, the declassified data storage component 350 may generate the key(s) in response to the request. In some implementations, the declassified data storage component 350 may have generated the key(s) prior to receiving the request. In either case, the declassified data storage component 350 may send (622) the encryption key to the classified data storage component 340 in response to the request.

The classified data storage component 340 may use the encryption key to encrypt (624) the classified data 645. In some implementations, the classified data storage component 340 may use symmetric-key cryptography to encrypt the classified data 645. For example, the classified data storage component 340 may generate a secret key 665 and use it to encrypt the classified data 645. The classified data storage component 340 may encrypt the secret key 665 using the public key 625 such that only a holder of the corresponding private key 635 (e.g., the declassified data storage component 350) may obtain the secret key 665 and use it to decrypt the encrypted declassified data 655. The classified data storage component 340 may then send (626) the encrypted classified data 645 (and, in some case, the encrypted secret key 665) to the AGS 120, which may then send (628) the encrypted classified data 645 to the secured data system 330. The secured data system 330 may send (630) encrypted declassified data 655 to the declassified data storage component 350. The declassified data storage component 350 may decrypt (632) the declassified data 655 (e.g., using the public key 625 and/or secret key 665). Following decryption, the client device 110 may access the now-decrypted, declassified data 655.

FIG. 7 is a block diagram illustrating an example user device 700 and system component 800 communicating over a computer network 199, according to embodiments of the present disclosure. In some implementations, the client device 110 may be a user device 700 as a shown in FIG. 7. In some implementations, the client device 110 may be a system component 800 as shown in FIG. 7 and/or a virtual machine executing on one or more system components 800. One or more system components 800 may make up one or more of the components described in the example environments 100, 300, 400, and/or 500. For example, the AGS 120, resource system 130, resource data storage component 140, identity provider system 150, and/or the distributed nodes 160 may be made up of (and/or execute on) one or more system component 800.

While the user device 700 may operate locally to a requestor 5 (e.g., within a same environment so the device may receive inputs and playback outputs for the requestor) the system component(s) 800 may be located remotely from the user device 700 as its operations may not require proximity to the requestor. The system component(s) may be located in an entirely different location from the user device 700 (for example, as part of a cloud computing system or the like) or may be located in a same environment as the user device 700 but physically separated therefrom (for example a home server or similar device that resides in a requestors home or office but perhaps in a closet, basement, attic, or the like). In some implementations, the system component(s) 800 may also be a version of a user device 700 that includes different (e.g., more) processing capabilities than other user device(s) 700 in a home/office. One benefit to the system component(s) 800 being in a requestor's home/office is that data used to process a command/return a response may be kept within the requestor's home/office, thus reducing potential privacy concerns.

The user device 700 may include one or more controllers/processors 704, which may each include a central processing unit (CPU) for processing data and computer-readable instructions, and a memory 706 for storing data and instructions of the respective device. The memories 706 may individually include volatile random-access memory (RAM), non-volatile read only memory (ROM), non-volatile magnetoresistive memory (MRAM), and/or other types of memory. User device 700 may also include a data storage component 708 for storing data and controller/processor-executable instructions. Each data storage component 708 may individually include one or more non-volatile storage types such as magnetic storage, optical storage, solid-state storage, etc. User device 700 may also be connected to removable or external non-volatile memory and/or storage (such as a removable memory card, memory key drive, networked storage, etc.) through respective input/output device interfaces 702.

Computer instructions for operating user device 700 and its various components may be executed by the respective device's controller(s)/processor(s) 704, using the memory 706 as temporary "working" storage at runtime. A device's computer instructions may be stored in a non-transitory manner in non-volatile memory 706, data storage component 708, or an external device(s). Alternatively, some or all of the executable instructions may be embedded in hardware or firmware on the respective device in addition to or instead of software.

User device 700 includes input/output device interfaces 702. A variety of components may be connected through the input/output device interfaces 702, as will be discussed further below. Additionally, user device 700 may include an address/data bus 710 for conveying data among components of the respective device. Each component within a user device 700 may also be directly connected to other components in addition to (or instead of) being connected to other components across the bus 710.

The user device 700 may include input/output device interfaces 702 that connect to a variety of components such as an audio output component such as a speaker 712, a wired headset or a wireless headset (not illustrated), or other component capable of outputting audio. The user device 700 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 700 may additionally include a display 716 for displaying content. The user device 700 may further include a camera 718.

Via antenna(s) 722, the input/output device interfaces 702 may connect to one or more computer networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface 702 may also include communication components that allow data to be exchanged between devices such as different physical servers in a collection of servers or other components.

The system component 800 may include one or more physical devices and/or one or more virtual devices, such as virtual systems that run in a cloud server or similar environment. The system component 800 may include one or more input/output device interfaces 802 and controllers/processors 804. The system component 800 may further include a memory 806 and storage 808. A bus 810 may allow the input/output device interfaces 802, controllers/processors 804, memory 806, and storage 808 to communicate with each other; the components may instead or in addition be directly connected to each other or be connected via a different bus.

A variety of components may be connected through the input/output device interfaces 802. For example, the input/output device interfaces 802 may be used to connect to the computer network 199. Further components include keyboards, mice, displays, touchscreens, microphones, speakers, and any other type of user input/output device. The components may further include USB drives, removable hard drives, or any other type of removable storage.

The controllers/processors 804 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 806 may include volatile random-access memory (RAM), non-volatile read only memory (ROM), non-volatile magnetoresistive (MRAM), and/or other types of memory. The memory 806 may be used for storing data and controller/processor-executable instructions on one or more non-volatile storage types, such as magnetic storage, optical storage, solid-state storage, etc.

Computer instructions for operating the system component 800 and its various components may be executed by the controller(s)/processor(s) 804 using the memory 806 as temporary "working" storage at runtime. The computer instructions may be stored in a non-transitory manner in the memory 806, storage 808, and/or an external device(s). Alternatively, some or all of the executable instructions may be embedded in hardware or firmware on the respective device in addition to or instead of software.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, by an access gateway system from a first client device, a first request for access to first data;
receiving, from the first client device, second data representing a zero-knowledge proof of possession of a first credential;
verifying, using the second data, that the first client device likely corresponds to the first credential;
in response to verifying that the first client device likely possesses the first credential, retrieving, from a distributed ledger system, policy data corresponding to the first credential;
determining that the policy data grants a possessor of the first credential access to the first data; and
in response to determining that the policy data grants the possessor of the first credential access to the first data:
causing a first data storage component to encrypt the first data using a first encryption key to generate first encrypted data, and
causing the first data storage component to send the first encrypted data to a second data storage component.

2. The computer-implemented method of claim 1, further comprising, prior to causing the first data storage component to encrypt the first data:
receiving the first encryption key from the second data storage component; and
sending the first encryption key to the first data storage component.

3. The computer-implemented method of claim 1, further comprising:
causing the second data storage component to decrypt the first encrypted data using a first decryption key, the first encryption key and the first decryption key representing public/private key pair.

4. The computer-implemented method of claim 1, wherein the first request represents a request declassify the first data, the method further comprising:
receiving the first encrypted data from the first data storage component, the first data storage component representing a secure data store; and
sending the first encrypted data to the second data storage component.

5. The computer-implemented method of claim 1, further comprising:
receiving, from an identity provider system, second data representing a verifier key, the identity provider system sending, to the first client device, third data representing a prover key corresponding to the verifier key;

causing the first client device to generate the first data using the third data; and processing the first data and the second data to determine that the first data likely represents a true claim.

6. The computer-implemented method of claim 1, further comprising:

sending, to the distributed ledger system, the policy data indicating a first association between the first credential and the policy data with respect to the first data; and sending, to the first client device, first credential data representing the first credential.

7. The computer-implemented method of claim 1, further comprising:

receiving, from the first client device, a second request for access to the first data, the first request corresponding to a first operation and the second request corresponding to a second operation different from the first operation;

determining that the policy data authorizes the first operation but not the second operation; and in response to determining that the policy data does not authorize the second operation, denying, by the access gateway system, the second request.

8. A system, comprising:

at least one processor; and at least one memory comprising instructions that, when executed by the at least one processor, cause the system to:

receive, by an access gateway system from a first client device, a first request for access to first data;

receive, from the first client device, second data representing a zero-knowledge proof of possession of a first credential;

verify, using the second data, that the first client device likely corresponds to the first credential;

in response to verifying that the first client device likely possesses the first credential, retrieve, from a distributed ledger system, policy data corresponding to the first credential;

determine that the policy data grants a possessor of the first credential access to the first data; and in response to determining that the policy data grants the possessor of the first credential access to the first data:

cause a first data storage component to encrypt the first data using a first encryption key to generate first encrypted data, and cause the first data storage component to send the first encrypted data to a second data storage component.

9. The system of claim 8, wherein the instructions further cause the system to, prior to causing the first data storage component to encrypt the first data:

receiving, from the second data storage component, the first encryption key; and sending the first encryption key to the first data storage component.

10. The system of claim 8, wherein the instructions further cause the system to:

cause the second data storage component to decrypt the first encrypted data using a first decryption key, the first encryption key and the first decryption key representing public/private key pair.

11. The system of claim 8, wherein the first request represents a request declassify the first data, and the instructions further cause the system to:

receive the first encrypted data from the first data storage component, the first data storage component representing a secure data store; and send the first encrypted data to the second data storage component.

12. The system of claim 8, wherein the instructions further cause the system to:

receive, from an identity provider system, second data representing a verifier key, the identity provider system sending, to the first client device, third data representing a prover key corresponding to the verifier key;

cause the first client device to generate the first data using the third data; and process the first data and the second data to determine that the first data likely represents a true claim.

13. The system of claim 8, wherein the instructions further cause the system to:

send, to the distributed ledger system, the policy data indicating a first association between the first credential and the policy data with respect to the first data; and send, to the first client device, first credential data representing the first credential.

14. The system of claim 8, wherein the instructions further cause the system to:

receive, from the first client device, a second request for access to the first data, the first request corresponding to a first operation and the second request corresponding to a second operation different from the first operation;

determine that the policy data authorizes the first operation but not the second operation; and in response to determining that the policy data does not authorize the second operation, deny, by the access gateway system, the second request.

15. A computer-implemented method comprising:

receiving, by an access gateway system from a first client device, a first request for access to first data;

receiving, from the first client device, second data representing a zero-knowledge proof of possession of a first credential;

verifying, using the second data, that the first client device likely corresponds to the first credential;

in response to verifying that the first client device likely possesses the first credential, retrieving, from a distributed ledger system, policy data corresponding to the first credential;

determining that the policy data grants a possessor of the first credential access to the first data;

in response to determining that the policy data grants the possessor of the first credential access to the first data, sending, to a first data storage component, a first encryption key;

receiving, from the first data storage component first encrypted data representing the first data; and sending the first encrypted data to a second data storage component, the second data storage component decrypting the first encrypted data using a first decryption key.

16. The computer-implemented method of claim 15, further comprising:

receiving, from the first data storage component, second encrypted data representing the first decryption key encrypted using the first encryption key, the first decryption key corresponding to a symmetric-key cryptography algorithm.

17. The computer-implemented method of claim 15, further comprising:

prior to sending the first encryption key to the first data storage component, receiving the first encryption key from the second data storage component; and sending, to the second data storage component, second encrypted data received from the first data storage component, the second data storage component decrypting the second encrypted data using a second decryption key, the first encryption key and the second decryption key corresponding to a public-key cryptography algorithm.

18. The computer-implemented method of claim 15, further comprising:

receiving, prior to sending the first encryption key to the first data storage component, the first encryption key from the second data storage component; and causing the first data storage component to encrypt the first data using the first encryption key.

19. The computer-implemented method of claim 15, further comprising:

receiving, from an identity provider system, second data representing a verifier key, the identity provider system sending, to the first client device, third data representing a prover key corresponding to the verifier key;

causing the first client device to generate the first data using the third data; and processing the first data and the second data to determine that the first data likely represents a true claim.

20. The computer-implemented method of claim 15, further comprising:

sending, to the distributed ledger system, the policy data indicating a first association between the first credential and the policy data with respect to the first data; and sending, to the first client device, first credential data representing the first credential.

* * * * *